US012424017B2

(12) United States Patent
Yoshida et al.

(10) Patent No.: US 12,424,017 B2
(45) Date of Patent: Sep. 23, 2025

(54) HUMAN SKELETON IMAGE APPARATUS, METHOD, AND NON-TRANSITORY COMPUTER READABLE MEDIUM

(71) Applicant: NEC Corporation, Tokyo (JP)

(72) Inventors: Noboru Yoshida, Tokyo (JP); Shoji Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 344 days.

(21) Appl. No.: 17/766,809

(22) PCT Filed: Oct. 31, 2019

(86) PCT No.: PCT/JP2019/042805
§ 371 (c)(1),
(2) Date: Apr. 6, 2022

(87) PCT Pub. No.: WO2021/084687
PCT Pub. Date: May 6, 2021

(65) Prior Publication Data
US 2024/0087353 A1 Mar. 14, 2024

(51) Int. Cl.
G06V 40/10 (2022.01)
G06T 7/60 (2017.01)
(Continued)

(52) U.S. Cl.
CPC ............ G06V 40/103 (2022.01); G06T 7/60 (2013.01); G06T 7/73 (2017.01); G06V 10/32 (2022.01);
(Continued)

(58) Field of Classification Search
CPC ...... G06V 10/32; G06V 10/44; G06V 10/764; G06V 20/52; G06V 40/103; G06V 40/23;
(Continued)

(56) References Cited

U.S. PATENT DOCUMENTS 10,321,728 B1 * 6/2019 Koh .................... G06T 7/11
2009/0232353 A1 9/2009 Sundaresan et al.
(Continued)

FOREIGN PATENT DOCUMENTS

CN 106022213 A 10/2016
CN 109919141 A 6/2019
(Continued)

OTHER PUBLICATIONS

JP Office Action for JP Application No. 2021-553986, mailed on Jun. 20, 2023 with English Translation.
(Continued)

Primary Examiner — Kenny A Cese
(74) Attorney, Agent, or Firm — Sughrue Mion, PLLC

(57) ABSTRACT

An image processing apparatus (10) according to the present disclosure includes: a skeleton detection unit (11) configured to detect a two-dimensional skeleton structure of a person based on an acquired two-dimensional image; an estimation unit (12) configured to estimate the height of the person when the person stands upright in a two-dimensional image space based on the two-dimensional skeleton structure detected by the skeleton detection unit (11); and a normalizing unit (13) configured to normalize the two-dimensional skeleton structure detected based on the height of the person when the person stands upright estimated by the estimation unit (12).

20 Claims, 29 Drawing Sheets

(51) Int. Cl.
*G06T 7/73* (2017.01)
*G06V 10/32* (2022.01)
*G06V 10/764* (2022.01)
*G06V 20/52* (2022.01)

(52) U.S. Cl.
CPC .. *G06V 10/764* (2022.01); *G06T 2207/20081* (2013.01); *G06T 2207/30196* (2013.01); *G06T 2207/30232* (2013.01); *G06V 20/52* (2022.01)

(58) Field of Classification Search
CPC . G06T 2207/10016; G06T 2207/20081; G06T 2207/30196; G06T 2207/30232; G06T 7/60; G06T 7/73; G06T 7/74
USPC ......................................................... 382/103
See application file for complete search history.

(56) References Cited

U.S. PATENT DOCUMENTS

| | | | |
|---|---|---|---|
| 2014/0334670 A1* | 11/2014 | Guigues | G06V 10/426 382/103 |
| 2014/0347479 A1* | 11/2014 | Givon | G06V 40/103 382/116 |
| 2019/0147292 A1 | 5/2019 | Watanabe et al. | |
| 2019/0251340 A1* | 8/2019 | Brown | G06N 3/045 |
| 2020/0193591 A1* | 6/2020 | Kamiyama | G06T 7/60 |
| 2020/0285845 A1 | 9/2020 | Oami | |
| 2021/0019507 A1* | 1/2021 | Brookshire | G06V 10/764 |
| 2022/0044070 A1* | 2/2022 | Koh | G06N 3/08 |
| 2022/0383653 A1 | 12/2022 | Yoshida et al. | |

FOREIGN PATENT DOCUMENTS

| | | |
|---|---|---|
| CN | 114616588 A | 6/2022 |
| JP | 2006-253932 A | 9/2006 |
| JP | 2015-097639 A | 5/2015 |
| JP | 2019-091138 A | 6/2019 |
| JP | 6534499 B | 6/2019 |
| WO | 2016/035941 A1 | 3/2016 |
| WO | 2019/064375 A1 | 4/2019 |

OTHER PUBLICATIONS

Shota Kushizaki et al., A Study on Person Identification Based on Walking Motion, research report of Information Processing Society, Mar. 17, 2018, vol. 2018-HCI-177, No. 31, pp. 1-4.
Atsuki Judai et al., Real-time 3D pose estimation by RGB-D camera for prediction of human motion, The Robotics and Mechatronics Conference, A collection of Lecture 2019, Jun. 5, 2019, pp. 1-2.
International Search Report for PCT Application No. PCT/JP2019/042805, mailed on Dec. 3, 2019.
Zhe Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, pp. 7291-7299.
Extended European Search Report for EP Application No. 19950977.9, dated on Nov. 8, 2022.
Mohamed El Amine Elforaici et al: "Posture recognition using an RGB-D camera: exploring 3D body modeling and deep learning approaches", arxiv.org, Sep. 30, 2018.
Elham Shabaninia et al: "A weighting scheme for mining key skeletal joints for human action recognition", Multimedia Tools and Applications, vol. 78, No. 22, Jul. 17, 2019, pp. 31319-31345.
CN Office Action for CN Application No. 201980101828.7, mailed on May 13, 2025 with English Translation.
"Research on Visual based Human Action Recognition Technology", Zhang Li, Information Technology Collection of China's Excellent Master's Thesis Full text Database, Issue (2016) 08, Aug. 15, 2016.

* cited by examiner

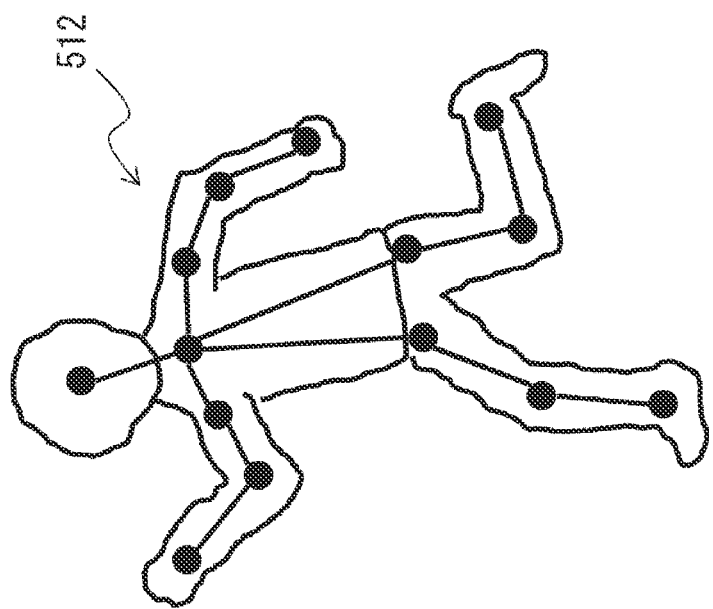
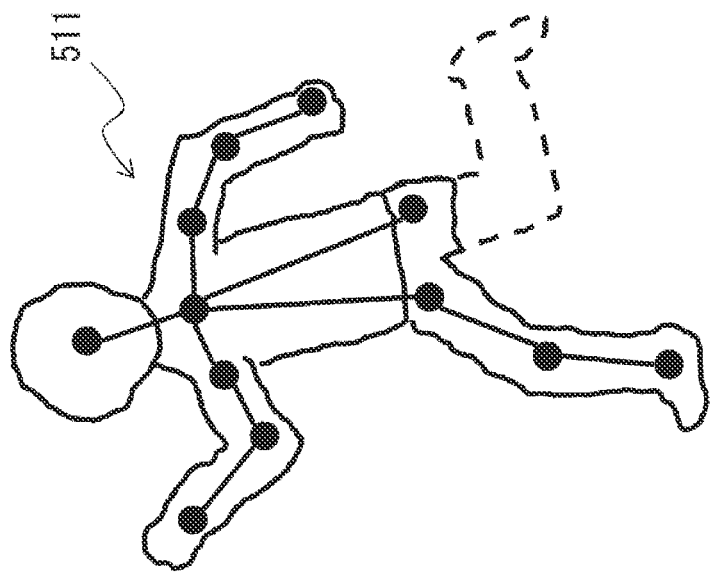
Fig. 27

HUMAN SKELETON IMAGE APPARATUS, METHOD, AND NON-TRANSITORY COMPUTER READABLE MEDIUM

This application is a National Stage Entry of PCT/JP2019/042805 filed on Oct. 31, 2019, the contents of all of which are incorporated herein by reference, in their entirety.

TECHNICAL FIELD

The present invention relates to an image processing apparatus, an image processing method, and a non-transitory computer readable medium storing an image processing program.

BACKGROUND ART

In recent years, techniques for detecting and retrieving states such as a posture or behavior of a person from an image captured by a monitoring camera have been used in, for example, monitoring systems. For example, Patent Literature 1 and 2 are known as related art. Patent Literature 1 discloses a technique of estimating the posture of a person from a captured image of the person and retrieving images including postures that are similar to the estimated posture. Patent Literature 2 discloses a technique of detecting a state of a person from a captured image of the person and estimating the body height of the person based on the detected state. Further, Non-Patent Literature 1 is known as a technique related to estimation of skeletons of persons.

CITATION LIST

Patent Literature

[Patent Literature 1] Japanese Unexamined Patent Application Publication No. 2019-091138
[Patent Literature 2] International Patent Publication No. WO 2019/064375

Non-Patent Literature

[Non-Patent Literature 1] Zhe Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, P. 7291-7299

SUMMARY OF INVENTION

Technical Problem

While the related art such as the aforementioned Patent Literature 1 uses feature amounts indicating features of a posture of a person in order to retrieve similar postures, since only retrieval from a specific viewpoint is taken into account, robustness against retrieval from various viewpoints may be low. Therefore, there is a problem in the related art that the robustness of state recognition processing such as the retrieval and the classification of a state of a person is low.

The present disclosure has been made in view of the aforementioned problem, and an object of the present disclosure is to provide an image processing apparatus, an image processing method, and a non-transitory computer readable medium storing an image processing program capable of improving robustness of state recognition processing of persons.

Solution to Problem

An image processing apparatus according to the present disclosure includes: skeleton detection means for detecting a two-dimensional skeleton structure of a person based on an acquired two-dimensional image; estimation means for estimating the height of the person when the person stands upright in a two-dimensional image space based on the detected two-dimensional skeleton structure; and normalizing means for normalizing the detected two-dimensional skeleton structure based on the estimated height of the person when the person stands upright.

An image processing method according to the present disclosure includes: detecting a two-dimensional skeleton structure of a person based on an acquired two-dimensional image; estimating the height of the person when the person stands upright in a two-dimensional image space based on the detected two-dimensional skeleton structure; and normalizing the detected two-dimensional skeleton structure based on the estimated height of the person when the person stands upright.

A non-transitory computer readable medium storing an image processing program according to the present disclosure causes a computer to execute processing of: detecting a two-dimensional skeleton structure of a person based on an acquired two-dimensional image; estimating the height of the person when the person stands upright in a two-dimensional image space based on the detected two-dimensional skeleton structure; and normalizing the detected two-dimensional skeleton structure based on the estimated height of the person when the person stands upright.

Advantageous Effects of Invention

According to the present disclosure, it is possible to provide an image processing apparatus, an image processing method, and a non-transitory computer readable medium storing an image processing program capable of improving robustness of state recognition processing of persons.

BRIEF DESCRIPTION OF DRAWINGS

FIG. 27 is a diagram for describing effects of the image processing method according to the first example embodiment;

DESCRIPTION OF EMBODIMENTS

Figure 1:
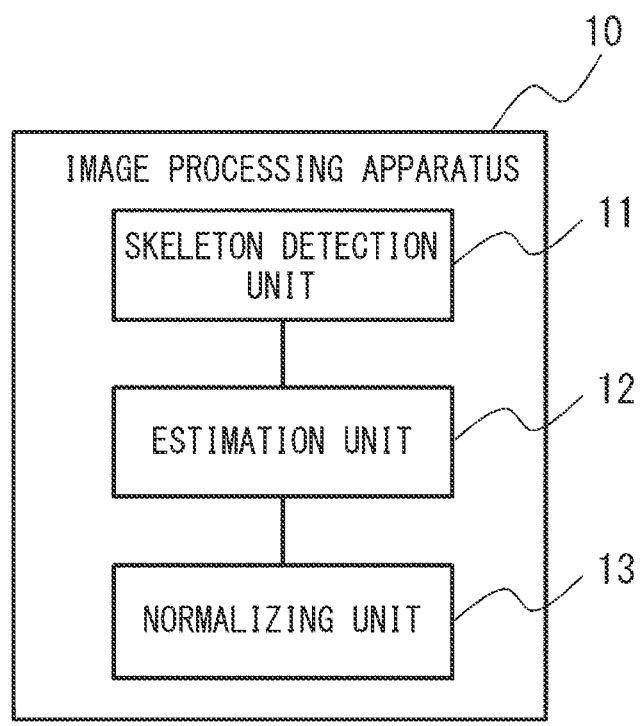
FIG. 1 is a configuration diagram showing an outline of an image processing apparatus according to an example embodiment.

Hereinafter, with reference to the drawings, an example embodiment will be described. Throughout the drawings, the same elements are denoted by the same reference symbols and duplicated descriptions will be omitted as necessary.

Considerations Leading to Example Embodiment

In recent years, image recognition techniques that use machine learning such as deep learning have been applied to various systems. For example, the image recognition techniques have been applied to monitoring systems that perform monitoring using images captured by a monitoring camera. By using machine learning in the monitoring systems, it is becoming possible to grasp the state such as a posture and behavior of a person from an image to some extent.

However, since prior preparation by machine learning is assumed in the above the related art, it is not always possible to grasp the state of a person whom the user wants to know on demand. That is, in the related art, it is necessary to learn a large number of images in which the state of a person is defined in advance (such as images of a sitting person or a person raising his/her hands). Then, it is difficult to perform machine learning when a state of a person that cannot be defined in advance is desired to be monitored.

Further, the related techniques do not take into account retrieval from various viewpoints. For example, some users may wish to determine that postures whose orientations are different from one another are the same posture if the postures are actually the same or to minimize the influence of the angle of view as much as possible. Although there is a method of converting posture information into features that are robust against the angle of view and the orientation of a person by using deep learning, this method requires a large amount of training data as described above, and is vulnerable to unknown postures (postures that are not included in the training data). Further, it is impossible to support flexible retrieval such as partial matching as in a case in which retrieval cannot be performed when, for example, a part of the body of the person is hidden.

In order to solve the aforementioned problem, the inventors have discussed a method of using a skeleton estimation technique like the one disclosed in Non-Patent Literature 1 in order to recognize the state of the person in a flexible manner without performing any prior preparation such as machine learning of states of a person. In related skeleton estimation techniques like in OpenPose disclosed in Non-Patent Literature 1, skeletons of a person are estimated by learning various patterns of annotated image data. In the following example embodiment, the use of the skeleton estimation technique enables state recognition processing with high robustness against the influence of the orientation of the person, the angle of view and the like.

Note that the skeleton structure estimated by the skeleton estimation technique such as OpenPose is formed of "key points", which are characteristic points such as joints and "bones (bone link)" indicating links between the key points. Therefore, while the skeleton structure will be described using the terms "key point" and "bone" in the following example embodiment, the "key point" corresponds to a "joint" of a person and the "bone" corresponds to a "bone" of the person unless otherwise limited.

Outline of Example Embodiment

FIG. 1 shows an outline of an image processing apparatus 10 according to an example embodiment. As shown in FIG. 1, the image processing apparatus 10 includes a skeleton detection unit 11, an estimation unit 12, and a normalizing unit 13. The skeleton detection unit 11 detects a two-dimensional skeleton structure of a person based on a two-dimensional image acquired by a camera or the like. The estimation unit 12 estimates the height of the person when the person stands upright in a two-dimensional image space based on the two-dimensional skeleton structure detected by the skeleton detection unit 11. The normalizing unit 13 normalizes the two-dimensional skeleton structure detected by the skeleton detection unit 11 based on the height of the person when the person stands upright estimated by the estimation unit 12.

As described above, in this example embodiment, the two-dimensional skeleton structure of the person is detected from the two-dimensional image and the two-dimensional skeleton structure is normalized based on the height of the person when the person stands upright estimated from the two-dimensional skeleton structure. It is therefore possible to improve robustness against an orientation or the like of the person in state recognition processing such as retrieval that uses the normalized normalizing value (features).

First Example Embodiment

Figure 2:
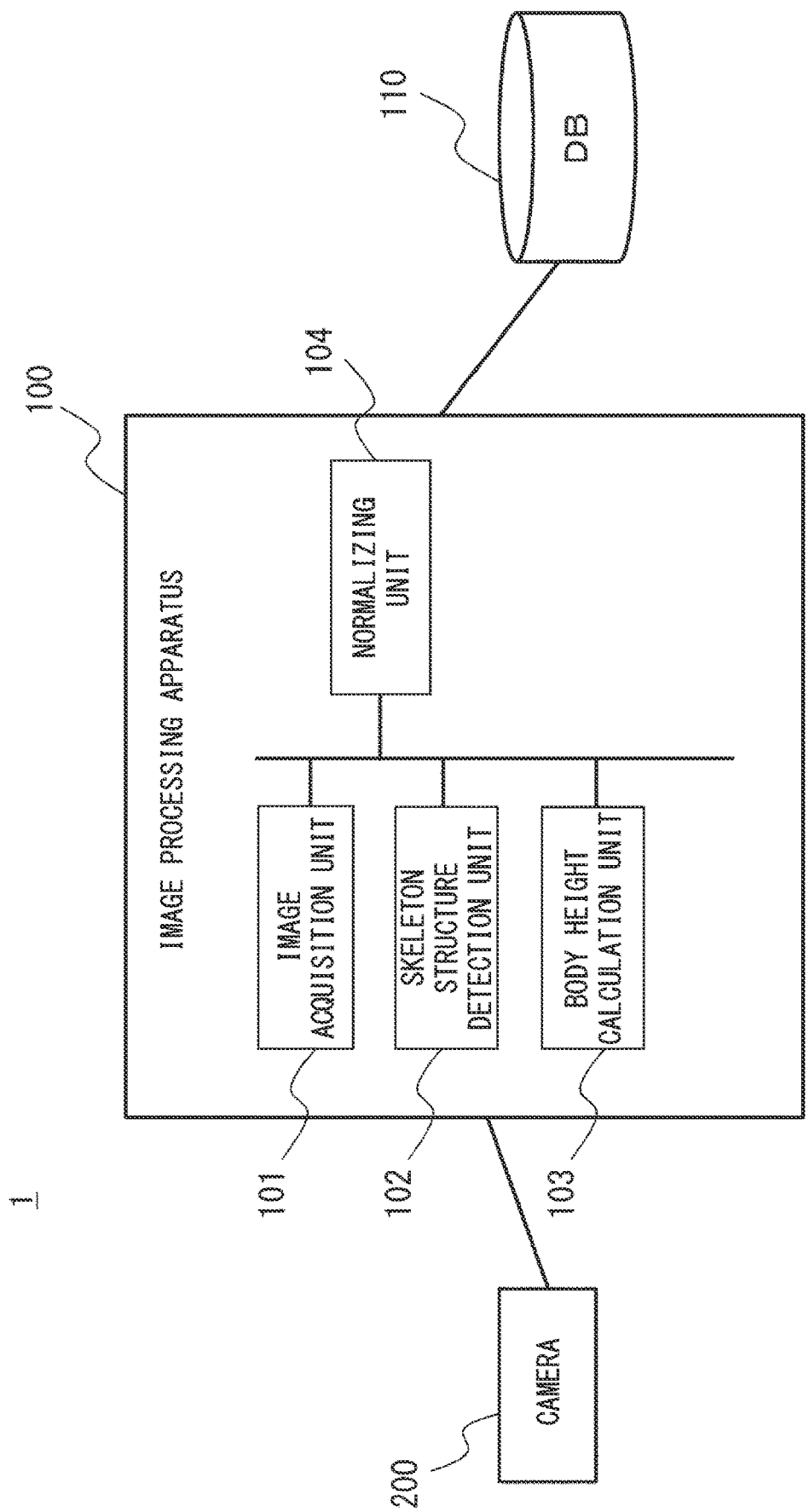
FIG. 2 is a configuration diagram showing a configuration of an image processing apparatus according to a first example embodiment.

Hereinafter, with reference to the drawings, a first example embodiment will be described. FIG. 2 shows a configuration of an image processing apparatus 100 according to this example embodiment. The image processing apparatus 100 forms an image processing system 1 along with a camera 200 and a database (DB) 110. The image processing system 1 including the image processing apparatus 100 is a system for normalizing a skeleton structure of a person estimated from an image. Further, it is possible to perform classification, retrieval, and the like of states of the person using features of the normalized skeleton structure.

The camera 200 is an image-capturing unit such as a monitoring camera that generates two-dimensional images. The camera 200 is installed in a predetermined place and captures images of persons or the like in the imaging area from the place where it is installed. The camera 200 is directly connected to the image processing apparatus 100 or is connected thereto via a network or the like in such a way that it can output the captured images (video images) to the image processing apparatus 100. Note that the camera 200 may be provided inside the image processing apparatus 100.

The database 110 is a database that stores information (data) necessary for processing of the image processing apparatus 100, results of processing in the image processing apparatus 100 and the like. The database 110 stores images acquired by an image acquisition unit 101, results of detection by a skeleton structure detection unit 102, data for machine learning, features normalized by a normalizing unit 104, and the like. The database 110 is directly connected to the image processing apparatus 100 or is connected thereto via a network or the like in such a way that the database 110 is able to input and output data to and from the image processing apparatus 100 as necessary. The database 110 may be provided inside the image processing apparatus 100 as a nonvolatile memory such as a flash memory or a hard disk apparatus.

As shown in FIG. 2, the image processing apparatus 100 includes the image acquisition unit 101, the skeleton structure detection unit 102, a body height calculation unit 103, and the normalizing unit 104. Note that the configuration of each part (block) is merely one example and the image processing apparatus 100 may be formed of other parts if a method (operation) described later is available. Further, while the image processing apparatus 100 is implemented by, for example, a computer apparatus such as a server or a personal computer that executes a program, it may be implemented by one apparatus or may be implemented by a plurality of apparatuses on a network. Note that an input unit through which operations from a user are input and a display unit that displays, for example, results of processing may also be provided as necessary.

The image acquisition unit 101 acquires two-dimensional images including persons captured by the camera 200. The image acquisition unit 101 acquires, for example, images including the persons (video image including a plurality of images) captured by the camera 200 in a predetermined monitoring period. The image acquisition unit 101 may not necessarily acquire images from the camera 200 and may acquire images including persons prepared in advance from the database 110 or the like.

The skeleton structure detection unit 102 detects a two-dimensional skeleton structure of a person in the image based on the acquired two-dimensional images. The skeleton structure detection unit 102 detects the skeleton structure for all the persons recognized in the acquired images. The skeleton structure detection unit 102 detects, using the skeleton estimation technique that uses machine learning, the skeleton structure of the person based on features of joints or the like of the person that is recognized. The skeleton structure detection unit 102 uses, for example, the skeleton estimation technique such as OpenPose disclosed in Non-Patent Literature 1.

The body height calculation unit (body height estimation unit) 103 calculates (estimates) the height of the person when the person stands upright (this is referred to as a body height pixel number) in the two-dimensional image based on the detected two-dimensional skeleton structure. It can also be said that the body height pixel number is the body height of the person in the two-dimensional image (the length of the whole body of a person in the two-dimensional image space). The body height calculation unit 103 obtains the body height pixel number (the number of pixels) from the lengths of the respective bones of the detected skeleton structure (the lengths in the two-dimensional image space).

In the following examples, specific examples 1-3 are used as a method of obtaining the body height pixel number. One of the methods described in the specific examples 1-3 may be used or a plurality of methods arbitrarily selected may be used in combination. In the specific example 1, the body height pixel number is obtained by adding up the lengths of the bones from the head part to the foot part of the bones of the skeleton structure. When the skeleton structure detection unit 102 (skeleton estimation technique) does not output the top of the head and the foot, obtained results may be corrected by multiplying them by a constant as necessary. In the specific example 2, the body height pixel number is calculated using a human body model indicating a relation between the lengths of the respective bones and the length of the whole body (the body height in the two-dimensional image space). In the specific example 3, the body height pixel number is calculated by fitting (applying) a three-dimensional human body model to the two-dimensional skeleton structure.

The normalizing unit 104 normalizes the skeleton structure (skeleton information) of the person based on the body height pixel number of the person that has been calculated. In this example, the normalizing unit 104 normalizes the height of each of the key points (feature points) included in the skeleton structure on the image by the body height pixel number. The normalizing unit 104 stores, in the database 110, features (normalizing values) of the skeleton structure that has been normalized. The height direction (the up-down direction or the vertical direction) is the up-down direction (Y-axis direction) in the space of two-dimensional coordinates (X-Y coordinates) of the image. In this case, the height of each of the key points can be obtained from the value (the number of pixels) of the Y-coordinate of each of the key points.

Alternatively, the height direction may be a direction of a vertical projection axis (vertical projection direction) in which the direction of a vertical axis that is vertical to the ground (reference plane) in the three-dimensional coordinate space in the real world is projected onto a two-dimensional coordinate space. In this case, the height of each of the key points can be obtained from a value (the number of pixels) along the vertical projection axis, which is obtained by projecting the axis vertical to the ground in the real world onto the two-dimensional coordinate space based on camera parameters. Note that the camera parameters, which are imaging parameters of an image, are, for example, the posture, the position, the imaging angle, and the focal distance of the camera 200. An object whose length and position are known in advance is captured by the camera 200 and the camera parameters can be obtained from this image. Some distortions occur in the both ends of the captured image, and the vertical direction in the real world may not coincide with the up-down direction of the image. On the other hand, by using parameters of the camera that has captured the image, it is possible to know how much the vertical direction in the real world is tilted in the image. Therefore, by normalizing the value of each of the key points along the vertical projection axis projected onto the image based on the camera parameters by the body height, the key points can be converted into features in consideration of the deviation between the real world and the image. The right-left direction (transverse direction) is the right-left direction (X-axis direction) in the space of the two-dimensional coordinates (X-Y coordinates) of the image or a direction obtained by projecting the direction parallel to the ground in the three-dimensional coordinate space in the real world onto the two-dimensional coordinate space.

Figure 3:
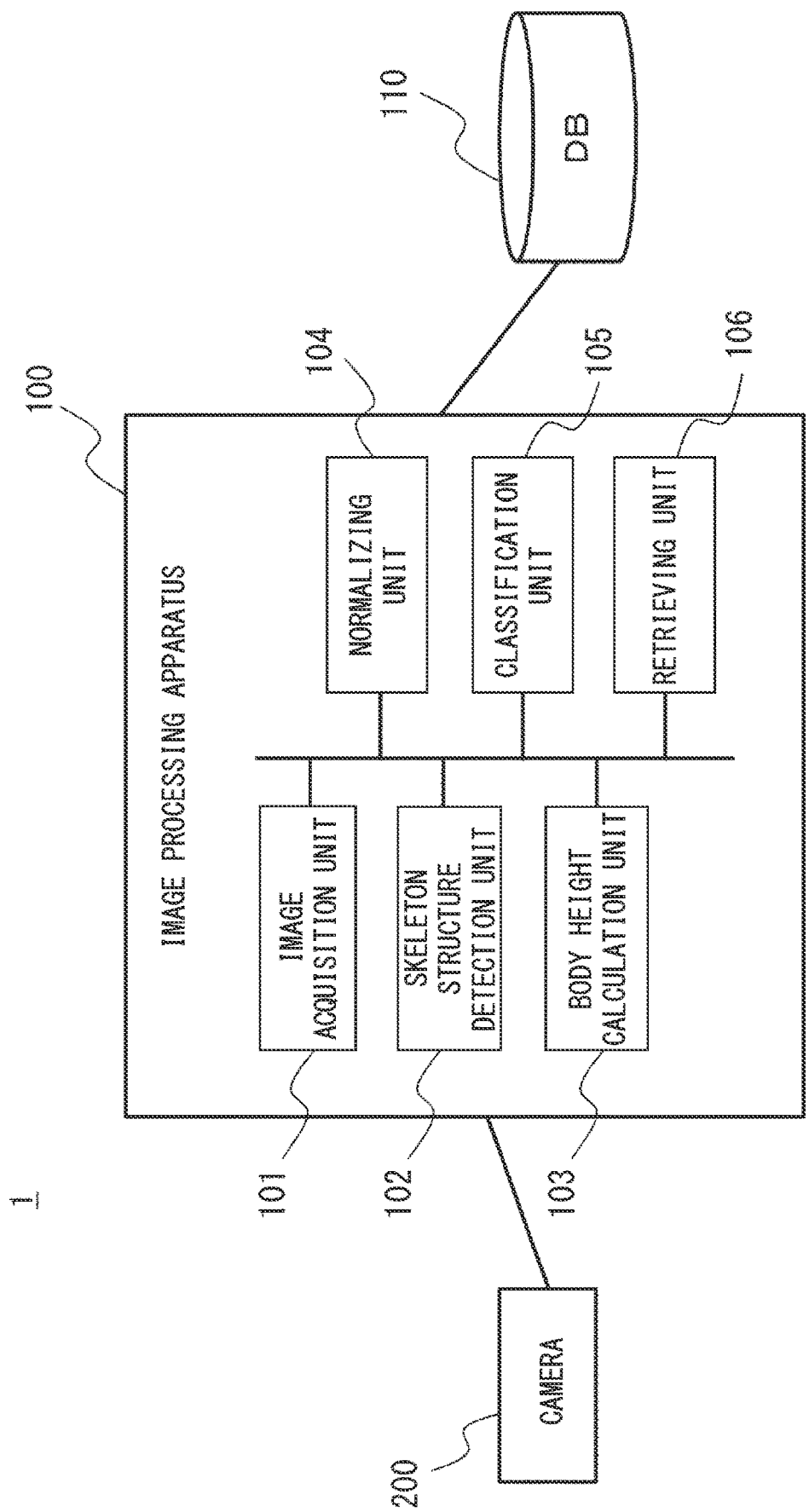
FIG. 3 is a configuration diagram showing another configuration of the image processing apparatus according to the first example embodiment.

As shown in FIG. 3, the image processing apparatus 100 may further include one or both of the classification unit 105 and the retrieving unit 106. One or both of the classification unit 105 and the retrieving unit 106 is a recognition unit that performs recognition processing of the state of the person. The classification unit 105 classifies (clusters) a plurality of skeleton structures stored in the database 110 based on a degree of similarity between the features of the skeleton structures. It can also be said that the classification unit 105 classifies states of a plurality of persons based on the features of the skeleton structures as processing of recognizing the states of the persons. Further, the retrieving unit 106 retrieves a skeleton structure which is quite similar to the features of the retrieval query (query state) from among the plurality of skeleton structures stored in the database 110. It can also be said that the retrieving unit 106 retrieves the state of the person that corresponds to a retrieval condition (query state) from among the states of the plurality of persons based on the features of the skeleton structures as the processing of recognizing the states of the persons.

The degree of similarity is a distance between features of the skeleton structures. The classification unit 105 and the retrieving unit 106 may classify and retrieve the postures based on the degree of similarity between the entire features of the skeleton structures or may classify and retrieve the postures based on the degree of similarity between some features of the skeleton structures. Further, the classification unit 105 and the retrieving unit 106 may classify and retrieve the postures of the person based on the features of the skeleton structures of the person in each image or classify and retrieve the behavior of the person based on a change in the features of the skeleton structures of the person in a plurality of images that are continuous in time. That is, the classification unit 105 and the retrieving unit 106 are able to classify and retrieve the states of the person including the postures and the behavior of the person based on the features of the skeleton structures.

Figure 4:
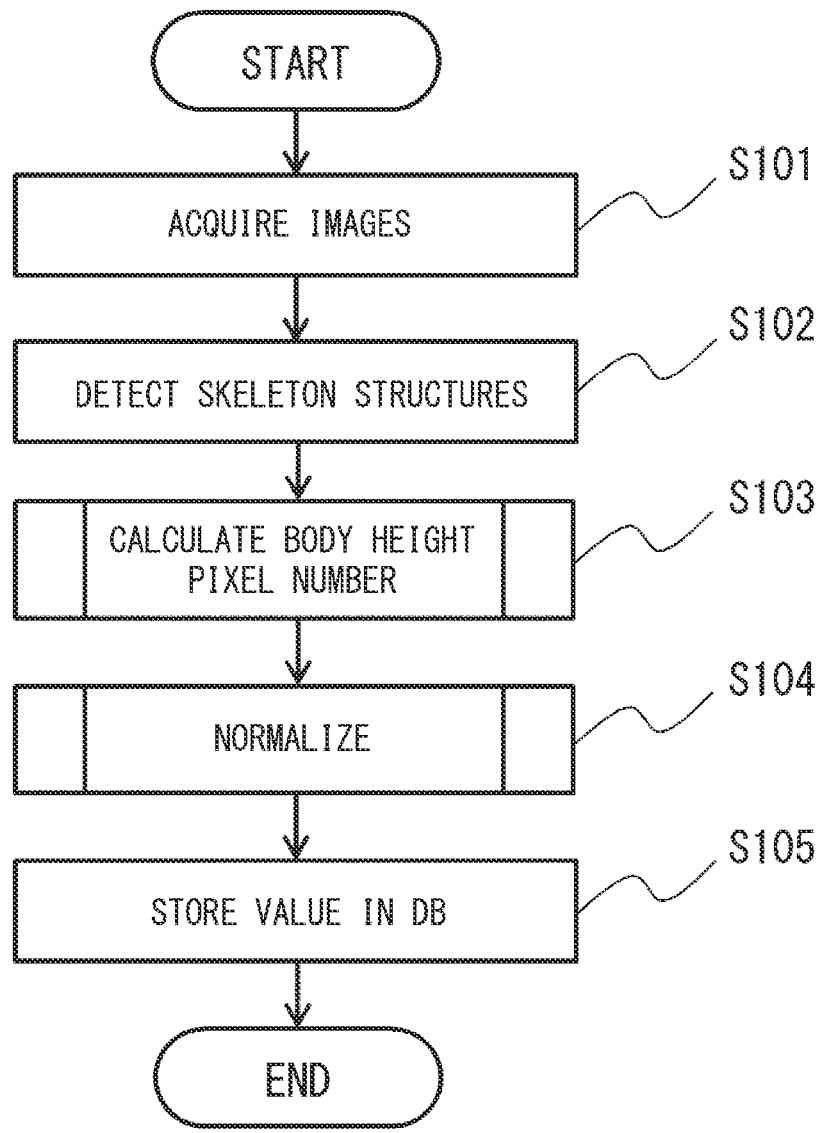
FIG. 4 is a flowchart showing an image processing method according to the first example embodiment.
Figure 5:
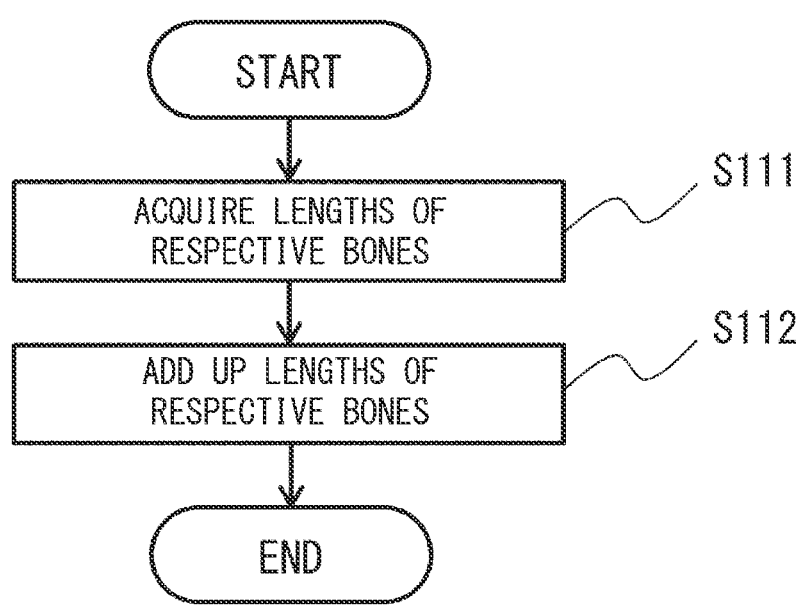
FIG. 5 is a flowchart showing a specific example 1 of a body height pixel number calculation method according to the first example embodiment.
Figure 6:
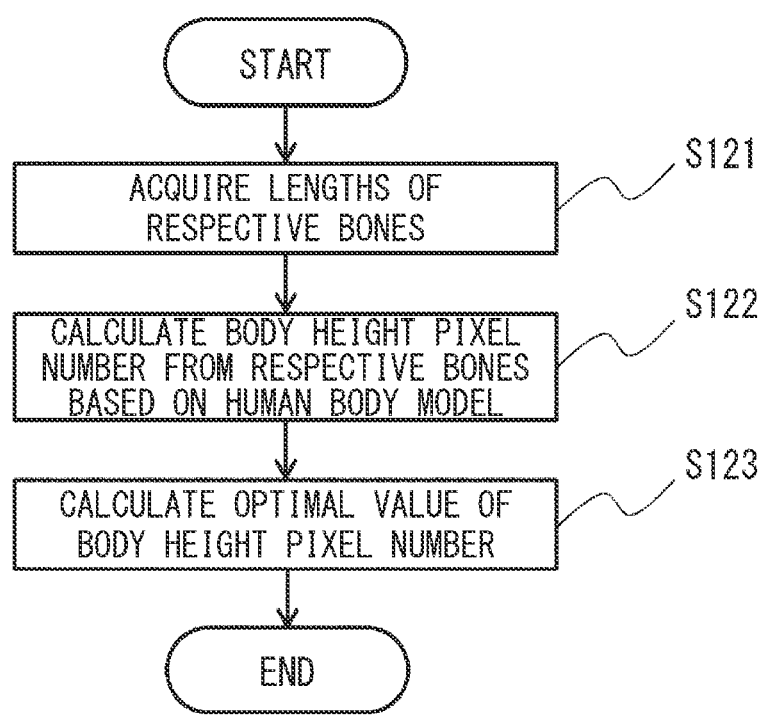
FIG. 6 is a flowchart showing a specific example 2 of the body height pixel number calculation method according to the first example embodiment.
Figure 7:
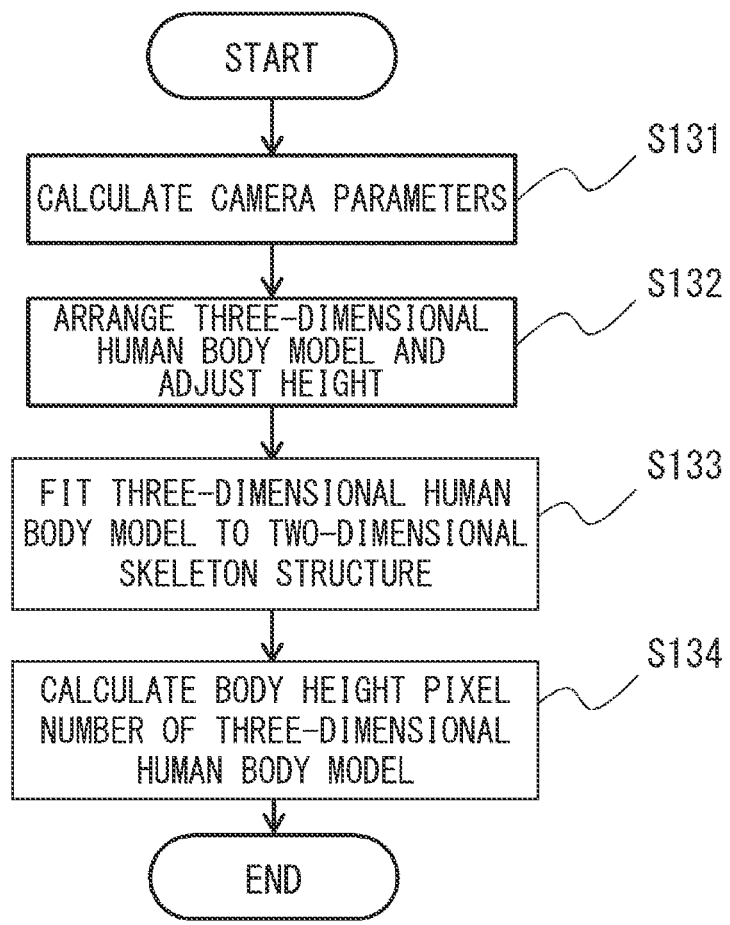
FIG. 7 is a flowchart showing a specific example 2 of the body height pixel number calculation method according to the first example embodiment.
Figure 8:
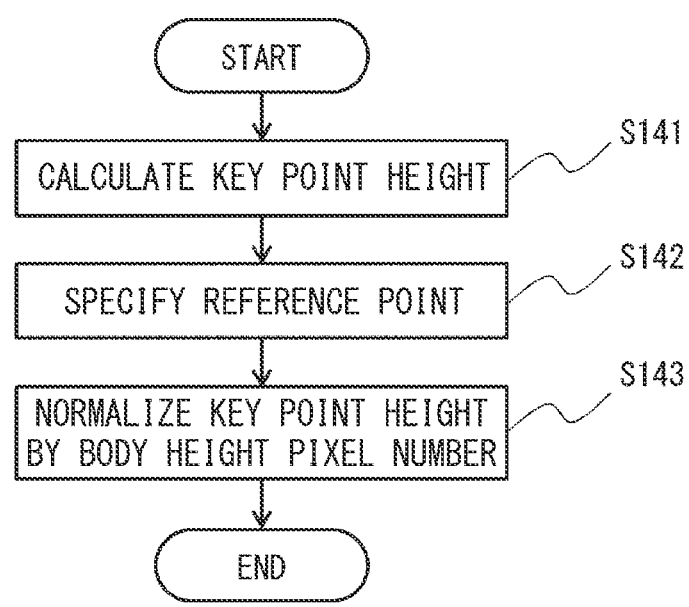
FIG. 8 is a flowchart showing a normalizing method according to the first example embodiment.

FIGS. 4-8 show operations of the image processing apparatus 100 according to this example embodiment. FIG. 4 shows a flow of processing in the image processing apparatus 100 from image acquisition to output of normalization information, FIGS. 5-7 show flows of the specific examples 1-3 of body height pixel number calculation processing (S103) shown in FIG. 4, and FIG. 8 shows a flow of normalization processing shown in FIG. 4 (S104).

As shown in FIG. 4, the image processing apparatus 100 acquires images from the camera 200 (S101). The image acquisition unit 101 acquires images of a person in order to perform normalization processing from a skeleton structure and stores the acquired images in the database 110. The image acquisition unit 101 acquires, for example, a plurality of images captured in a predetermined monitoring period, and performs the following processing for all the persons included in the plurality of images.

Figure 9:
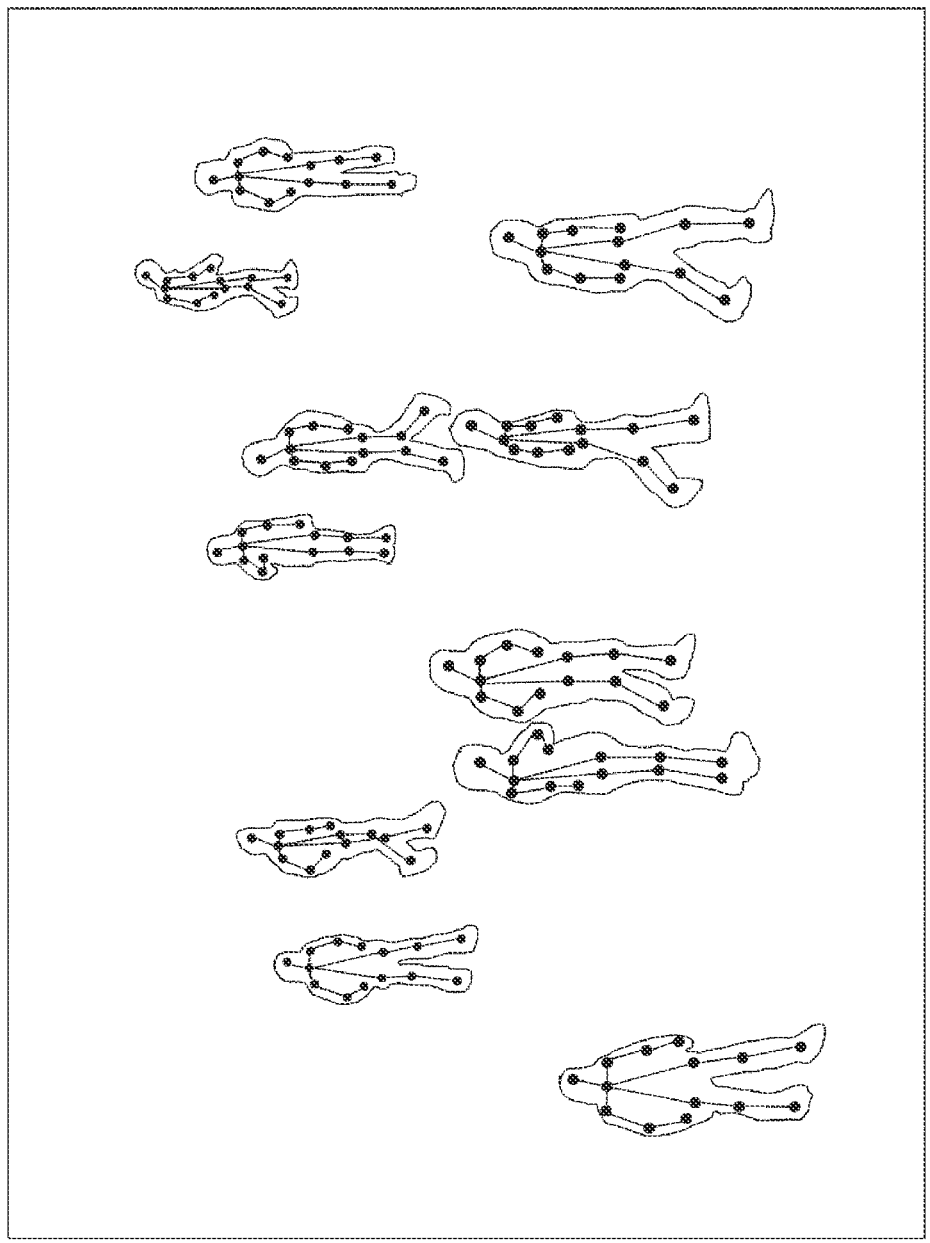
FIG. 9 is a diagram showing an example of detecting a skeleton structure according to the first example embodiment.

Next, the image processing apparatus 100 detects skeleton structures of persons based on the images of the persons that have been acquired (S102). FIG. 9 shows an example of detecting skeleton structures. As shown in FIG. 9, the image captured from a monitoring camera or the like includes a plurality of persons and the skeleton structure is detected for each person included in the image.

Figure 10:
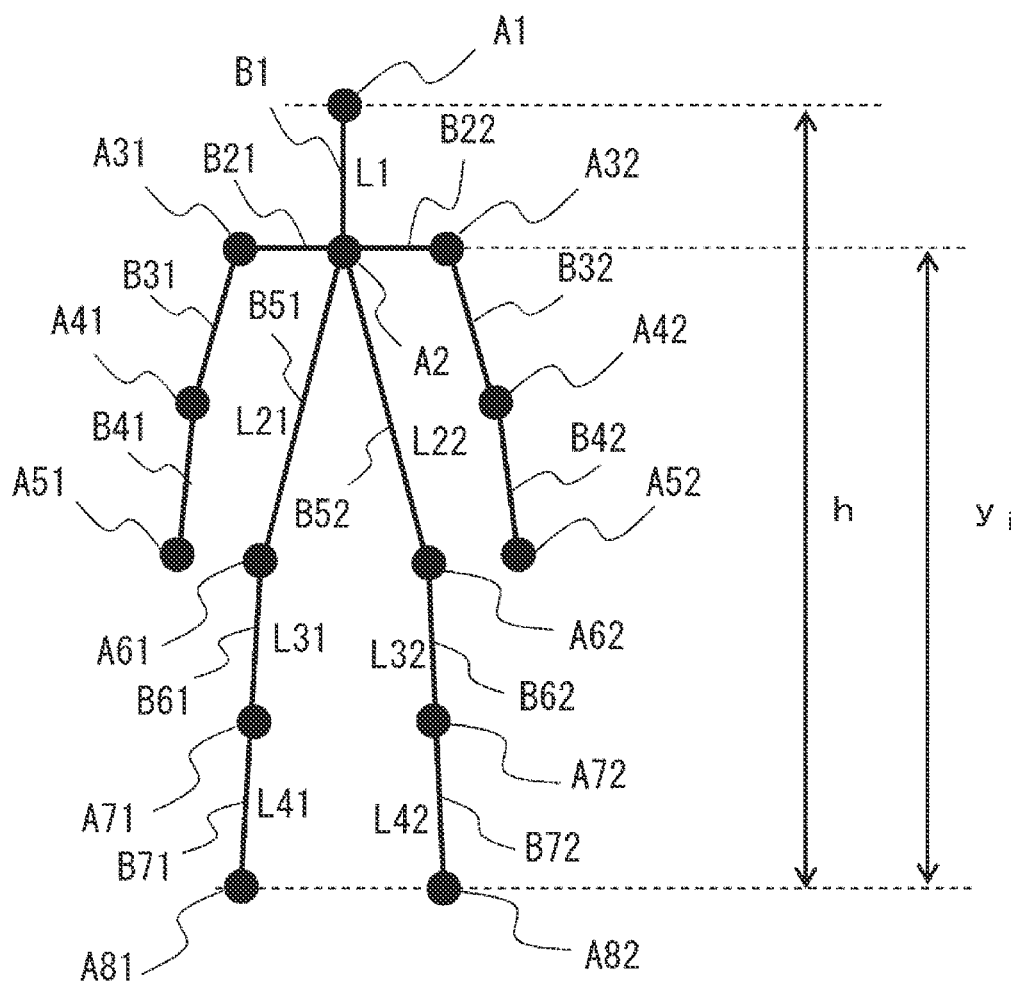
FIG. 10 is a diagram showing a human body model according to the first example embodiment.
Figure 11:
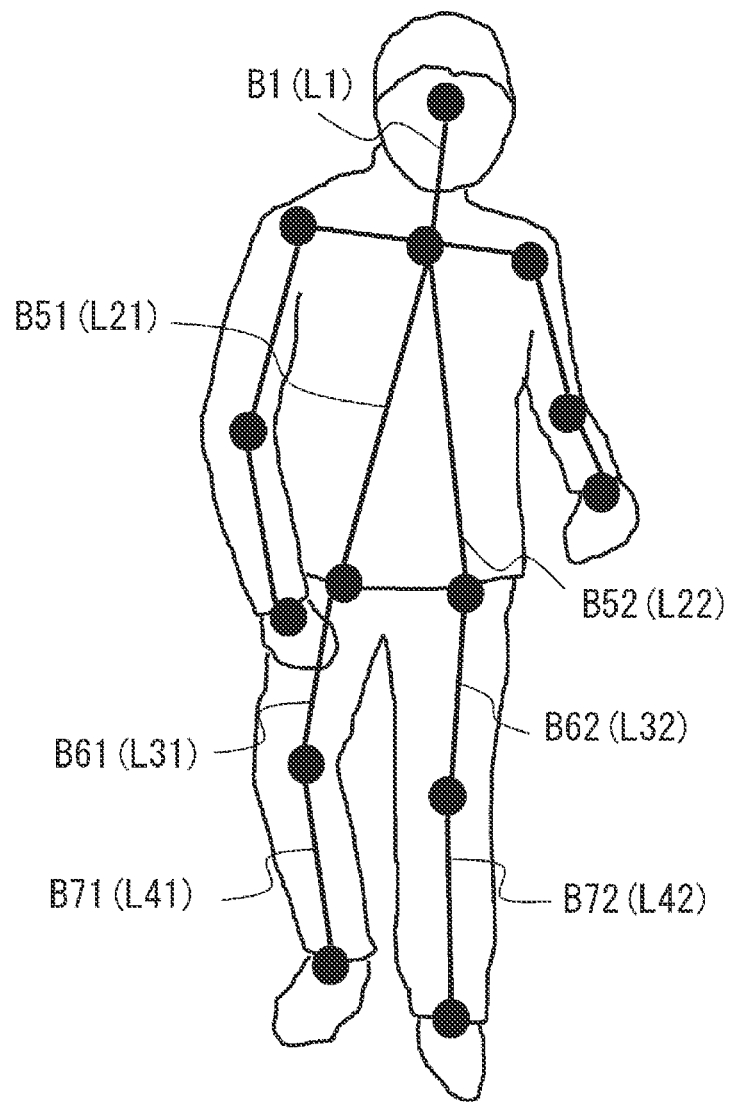
FIG. 11 is a diagram showing an example of detecting the skeleton structure according to the first example embodiment.
Figure 12:
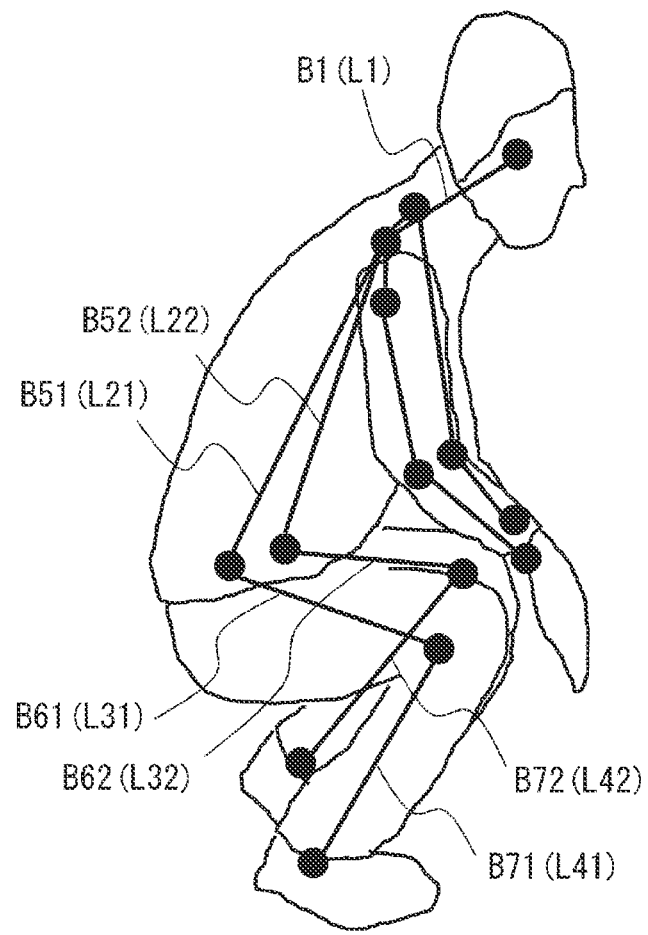
FIG. 12 is a diagram showing an example of detecting the skeleton structure according to the first example embodiment.
Figure 13:
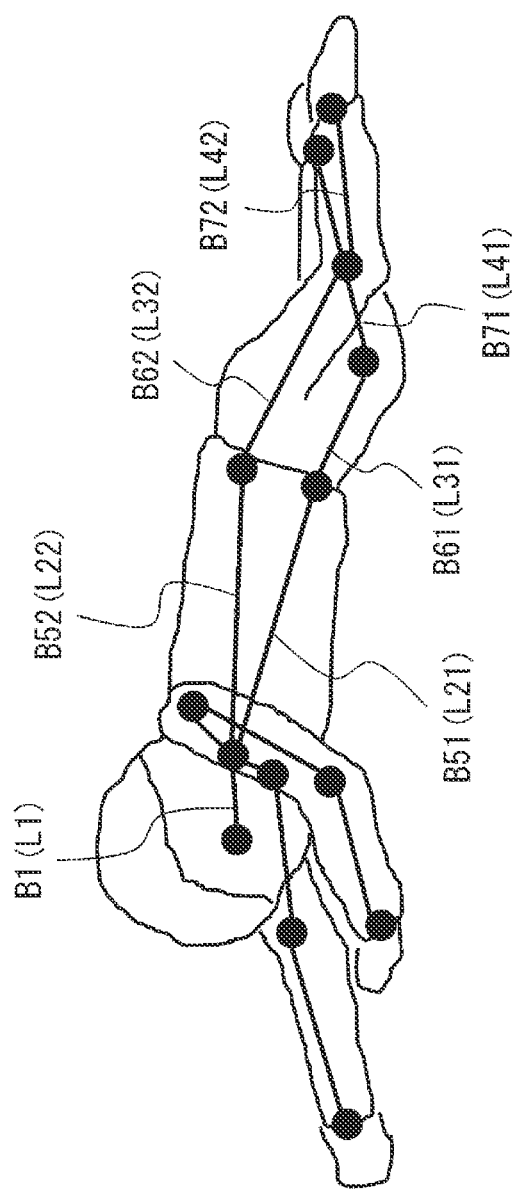
FIG. 13 is a diagram showing an example of detecting the skeleton structure according to the first example embodiment.

FIG. 10 shows a skeleton structure of a human body model 300 detected at this time and FIGS. 11-13 show examples of detecting the skeleton structures. The skeleton structure detection unit 102 detects the skeleton structure of the human body model (two-dimensional skeleton model) 300 as shown in FIG. 10 from the two-dimensional image using the skeleton estimation technique such as OpenPose. The human body model 300 is a two-dimensional model composed of key points such as joints of the person and bones connecting the key points. In this example, as shown in FIG. 10, the height of the skeleton structure of the person when the person is standing in the image is indicated by a body height pixel number (h) and the height of each key point of the skeleton structure in the state of the person in the image is indicated by a key point height ($y_i$).

The skeleton structure detection unit 102 extracts, for example, feature points that may become key points from the image, refers to information obtained by performing machine learning of the image of the key points, and detects each key point of the person. In the example shown in FIG. 10, a head A1, a neck A2, a right shoulder A31, a left shoulder A32, a right elbow A41, a left elbow A42, a right hand A51, a left hand A52, a right waist A61, a left waist A62, a right knee A71, a left knee A72, a right foot A81, and a left foot A82 are detected as key points of the person. Further, as bones of the person connecting these key points, a bone B1 connecting the head A1 and the neck A2, a bone B21 connecting the neck A2 and the right shoulder A31 and a bone B22 connecting the neck A2 and the left shoulder A32, a bone B31 connecting the right shoulder A31 and the right elbow A41 and a bone B32 connecting the left shoulder A32 and the left elbow A42, a bone B41 connecting the right elbow A41 and the right hand A51 and a bone B42 connecting the left elbow A42 and the left hand A52, a bone B51 connecting the neck A2 and the right waist A61 and a bone B52 connecting the neck A2 and the left waist A62, a bone B61 connecting the right waist A61 and the right knee A71 and a bone B62 connecting the left waist A62 and the left knee A72, and a bone B71 connecting the right knee A71 and the right foot A81 and a bone B72 connecting the left knee A72 and the left foot A82 are detected.

FIG. 11 is an example of detecting a person who is standing upright. In FIG. 11, an image of the person who is standing upright is captured from the front, the bone B1, the bone B51 and the bone B52, the bone B61 and the bone B62, and the bone B71 and the bone B72 seen from the front are detected without overlapping each other, and the bones B61 and B71 of the right leg are bent slightly more than the bones B62 and B72 of the left leg are.

FIG. 12 is an example of detecting a crouching person. In FIG. 12, an image of the crouching person is captured from the right side, the bone B1, the bone B51 and the bone B52, the bone B61 and the bone B62, the bone B71 and the bone B72 seen from the right side are each detected, and the bones B61 and B71 of the right leg and the bones B62 and B72 of the left leg are greatly bent and overlap each other.

FIG. 13 is an example of detecting a person who is lying down. In FIG. 13, an image of the person who is lying down is captured from the diagonally forward left, the bone B1, the bone B51 and the bone B52, the bone B61 and the bone B62, and the bone B71 and the bone B72 seen from the diagonally forward left are each captured, and the bones B61 and B71 of the right leg and the bones B62 and B72 of the left leg are bent and overlap each other.

Next, as shown in FIG. 4, the image processing apparatus 100 performs body height pixel number calculation processing based on the detected skeleton structure (S103). Hereinafter, specific examples 1-3 of the body height pixel number calculation processing will be described.

Specific Example 1

In a specific example 1, the body height pixel number is obtained using the lengths of the bones from the head part to the foot part. In the specific example 1, as shown in FIG. 5, the body height calculation unit 103 acquires the lengths of the respective bones (S111) and adds up the lengths of the respective bones that have been acquired (S112).

The body height calculation unit 103 acquires the lengths of the bones from the head part to the foot part of the person on the two-dimensional image to obtain the body height pixel number. That is, of the bones shown in FIG. 10, the length (the number of pixels) of each of the bone B1 (length L1), the bone B51 (length L21), the bone B61 (length L31) and the bone B71 (length L41), or the bone B1 (length L1), the bone B52 (length L22), the bone B62 (length L32) and the bone B72 (length L42) is acquired from the image in which the skeleton structure has been detected. The lengths of the respective bones can be obtained from the coordinates of the respective key points in the two-dimensional image. A value obtained by multiplying L1+L21+L31+L41 or L1+L22+L32+L42 by a correction constant is calculated as the body height pixel number (h). When the both values can be calculated, the value indicating the larger length is, for example, set as the body height pixel number. That is, the length of each bone in an image becomes the largest when it is captured from the front and the length of each bone becomes shorter when an angle at which the image is captured is tilted in the depth direction with respect to the camera. Accordingly, longer bones tend to indicate that they are highly likely to have been captured from the front and tend to be close to the actual value. Therefore, the longer one is preferably selected.

In the example shown in FIG. 11, the bone B1, the bone B51 and the bone B52, the bone B61 and the bone B62, and the bone B71 and the bone B72 are detected without overlapping each other. L1+L21+L31+L41 and L1+L22+L32+L42, each of which is the sum of these bones, are obtained. Then, for example, a value obtained by multiplying L1+L22+L32+L42, which is the sum of the bones on the left leg side whose length of the bones that has been detected is larger, by a correction constant is set as the body height pixel number.

In the example shown in FIG. 12, the bone B1, the bone B51 and the bone B52, the bone B61 and the bone B62, and the bone B71 and the bone B72 are each detected, and the bones B61 and B71 of the right leg and the bones B62 and B72 of the left leg overlap each other. L1+L21+L31+L41 and L1+L22+L32+L42, each of which is the sum of these bones, are obtained. Then, for example, a value obtained by multiplying L1+L21+L31+L41, which is the sum of the bones on the right leg side whose length of the bones that has been detected is larger, by a correction constant is set as the body height pixel number.

In the example shown in FIG. 13, the bone B1, the bone B51 and the bone B52, the bone B61 and the bone B62, the bone B71 and the bone B72 are each detected, and the bones B61 and B71 of the right leg and the bones B62 and B72 of the left leg overlap each other. For example, L1+L21+L31+L41 and the L1+L22+L32+L42, each of which is the sum of these bones, are obtained. Then, for example, a value obtained by multiplying L1+L22+L32+L42, which is the sum of the bones on the left leg side whose length of the bones that has been detected is larger, by a correction constant is set as the body height pixel number.

In the specific example 1, the body height can be obtained by adding up the lengths of the bones from the head to the foot, whereby the body height pixel number can be obtained in a simple method. Further, since it is sufficient that at least skeletons from the head to the foot be detected by the skeleton estimation technique using machine learning, the body height pixel number can be estimated with a high accuracy even in a case in which the entire person is not always shown in the image, such as in a case in which the person is crouching.

Specific Example 2

In a specific example 2, a body height pixel number is obtained using a two-dimensional skeleton model indicating a relation between lengths of bones included in a two-dimensional skeleton structure and the length of the whole body of a person in a two-dimensional image space.

Figure 14:
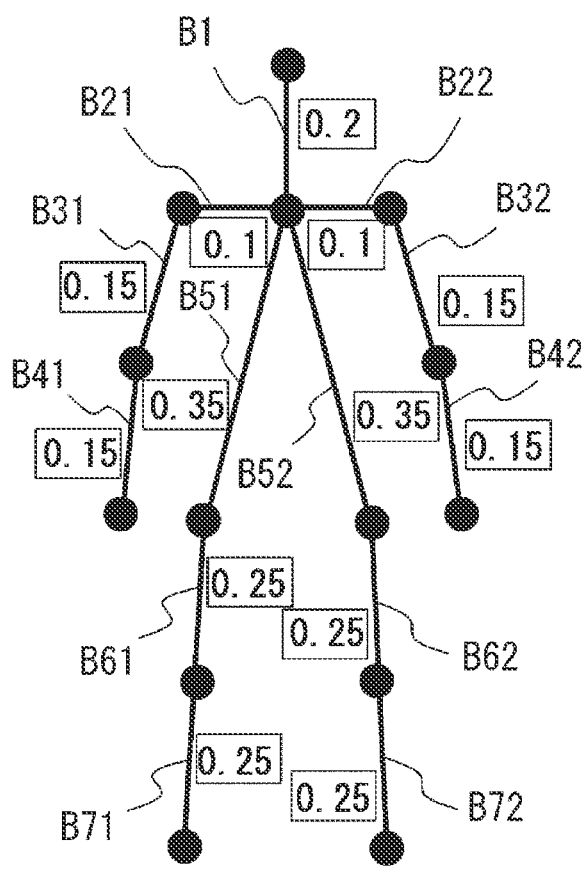
FIG. 14 is a diagram showing a human body model according to the first example embodiment.

FIG. 14 is a human body model (two-dimensional skeleton model) 301 indicating a relation between the lengths of the respective bones in the two-dimensional image space and the length of the whole body in the two-dimensional image space used in the specific example 2. As shown in FIG. 14, the relation between the lengths of the respective bones of an average person and the length of the whole body of the average person (the percentage of the lengths of the respective bones to the length of the whole body) is made to correspond to the respective bones of the human body model 301. For example, the length of the bone B1 of the head is equal to the length of the whole body×0.2 (20%), the length of the bone B41 of the right hand is equal to the length of the whole body×0.15 (15%), and the length of the bone B71 of the right leg is equal to the length of the whole body×0.25 (25%). By storing information on the human body model 301 in the database 110, the average length of the whole body can be obtained from the lengths of the respective bones. In addition to or in place of the human body model of the average person, a human body model may be prepared for each of the attributes of the person such as the age, the sex, and the nationality. Accordingly, the length of the whole body (body height) can be appropriately obtained depending on the attributes of the person.

Figure 15:
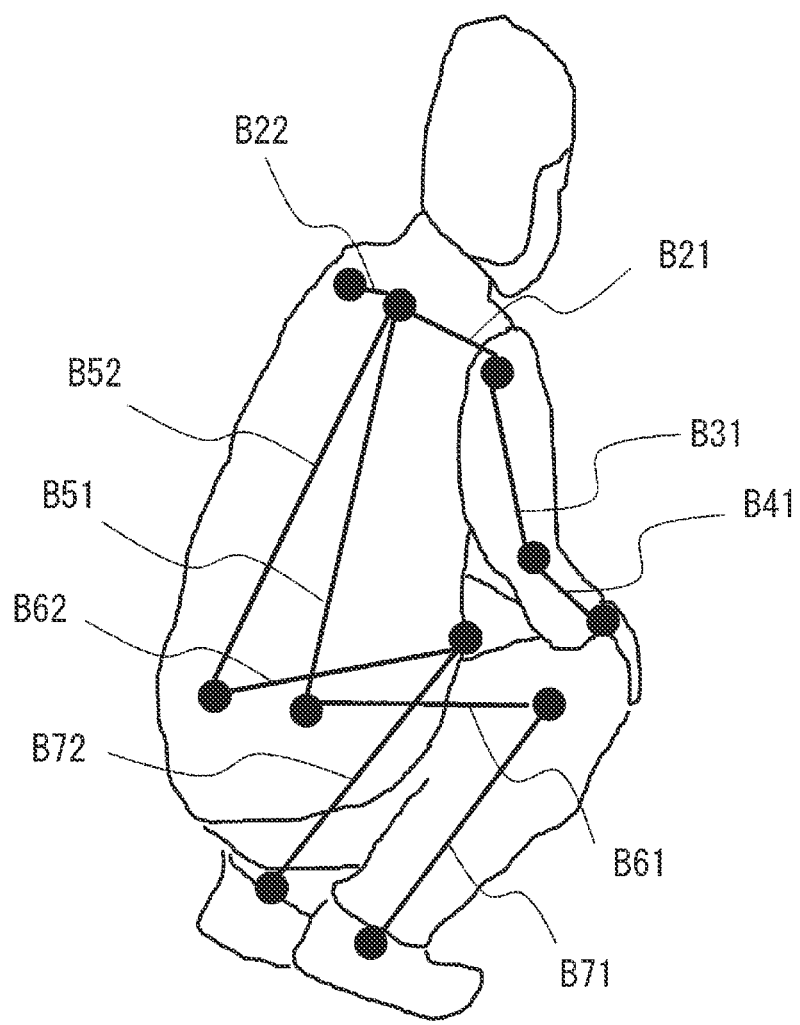
FIG. 15 is a diagram showing an example of detecting the skeleton structure according to the first example embodiment.

In the specific example 2, as shown in FIG. 6, the body height calculation unit 103 acquires the lengths of the respective bones (S121). The body height calculation unit 103 acquires the lengths of all the bones (the lengths of the bones in the two-dimensional image space) in the detected skeleton structure. FIG. 15 is an example in which an image of a crouching person is captured from the diagonally right back and the skeleton structure is detected. In this example, since the left side of the face of the person is not shown in the image, the bone of the head and those of the left arm and the left hand have not been detected. Therefore, the lengths of the respective bones B21, B22, B31, B41, B51, B52, B61, B62, B71, and B72 that have been detected are acquired.

Next, as shown in FIG. 6, the body height calculation unit 103 calculates the body height pixel number from the lengths of the respective bones based on the human body model (S122). The body height calculation unit 103 refers to the human body model 301 indicating the relation between the respective bones and the length of the whole body as shown in FIG. 14, and thus obtains the body height pixel number from the lengths of the respective bones. For example, since the length of the bone B41 of the right hand is equal to the length of the whole body×0.15, the body height pixel number which is based on the bone B41 is obtained from the length of the bone B41/0.15. Further, since the length of the bone B71 of the right leg is equal to the length of the whole body×0.25, the body height pixel number based on the bone B71 is obtained from the length of the bone B71/0.25.

While the human body model referred to at this time is, for example, the human body model of the average person, the human body model may be selected depending on the attributes of a person such as the age, the sex, and the nationality. When, for example, the face of the person is shown in the captured image, the attributes of the person are identified based on the face of this person and the human body model that corresponds to the identified attributes is referred to. It is possible to recognize the attributes of the person from the features of the face of the image by referring to information obtained by machine learning the face for each attribute. Further, the human body model of the average person may be used when the attributes of the person cannot be identified from the image.

Further, the body height pixel number calculated from the lengths of the bones may be corrected by camera parameters. When, for example, the camera is positioned in a high place and is made to capture an image of the person in such a way that it looks down at the person, the horizontal length such as bones of the shoulder width in the two-dimensional skeleton structure is not affected by the angle of depression of the camera, whereas the vertical length such as bones of the neck-waist becomes smaller as the angle of depression of the camera increases. Then, the body height pixel number calculated from the horizontal length such as bones of the shoulder width tends to become larger than the actual length. By using the camera parameters, it can be seen at what angle the camera looks down at the person, whereby it is possible to correct the body height pixel number to a two-dimensional skeleton structure that looks as if the image of the person were captured from the front by using the information on the angle of depression. It is therefore possible to calculate the body height pixel number more accurately.

Figure 16:
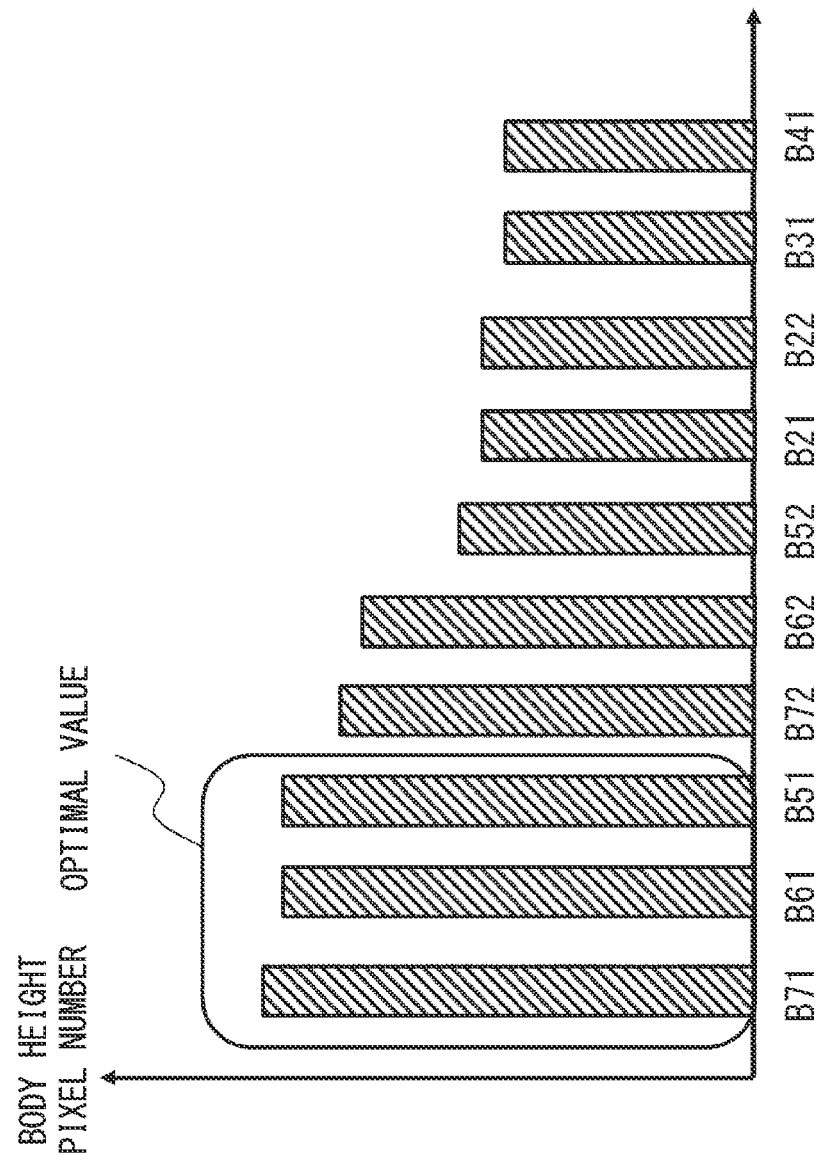
FIG. 16 is a histogram for describing the body height pixel number calculation method according to the first example embodiment.

Next, as shown in FIG. 6, the body height calculation unit 103 calculates an optimal value of the body height pixel number (S123). The body height calculation unit 103 calculates the optimal value of the body height pixel number from the body height pixel number obtained for each bone. For example, a histogram of body height pixel numbers obtained for the respective bones as shown in FIG. 16 is generated, and the largest body height pixel number is selected from among them. That is, one of the body height pixel numbers obtained based on the plurality of bones that is larger than the other ones is selected. It is assumed, for example, that the values of the top 30% are valid values. In FIG. 16, body height pixel numbers obtained based on the bones B71, B61, and B51 are selected. The average value of the selected body height pixel numbers may be obtained as the optimal value or the largest body height pixel number may be obtained as the optimal value. Since the body height is obtained from the lengths of the bones of the two-dimensional image, when the image of the bones has not been captured from the front, that is, when the image of the bones has been captured obliquely in the depth direction when they are seen from the camera, the lengths of the bones become shorter than those in a case in which they are captured from the front. Then, a value whose body height pixel number is large means that an image is likely to have been captured from the front and is likely to be more appropriate than a value whose body height pixel number is small. Therefore, a value that is larger than the other ones is set as the optimal value.

In the specific example 2, the body height pixel number is obtained based on the bones of the skeleton structure that has been detected, using a human body model indicating the relation between the bones in the two-dimensional image space and the length of the whole body. Therefore, even when not all the skeletons from the head to the foot can be obtained, the body height pixel number can be obtained from some bones. In particular, by employing one of the values obtained from the plurality of bones which is larger than the other ones, the body height pixel number can be estimated with a high accuracy.

Specific Example 3

In a specific example 3, a two-dimensional skeleton structure is made to fit to a three-dimensional human body model (three-dimensional skeleton model), and a skeleton vector of the whole body is obtained using the body height pixel number of the three-dimensional human body model fit to the two-dimensional skeleton structure.

In the specific example 3, as shown in FIG. 7, the body height calculation unit 103 first calculates camera parameters based on images captured by the camera 200 (S131). The body height calculation unit 103 extracts an object whose length is known in advance from among the plurality of images captured by the camera 200 and obtains camera parameters from the size (the number of pixels) of the object that has been extracted. The camera parameters may be obtained in advance and the camera parameters obtained in advance may be acquired as necessary.

Next, the body height calculation unit 103 adjusts the arrangement and the height of the three-dimensional human body model (S132). The body height calculation unit 103 prepares, for a detected two-dimensional skeleton structure, a three-dimensional human body model for calculating the body height pixel number and arranges it in the same two-dimensional image based on the camera parameters. Specifically, "a relative positional relationship between the camera and the person in the real world" is specified from the camera parameters and the two-dimensional skeleton structure. The body height calculation unit 103 specifies the coordinates (x, y, z) of the position where the person is standing (or sitting), assuming, for example, that the coordinates of the position of the camera are (0, 0, 0). Then, by assuming an image captured by arranging the three-dimensional human body model in the position (x, y, z) the same as that of the specified person, the two-dimensional skeleton structure is made to overlap the three-dimensional human body model.

Figure 17:
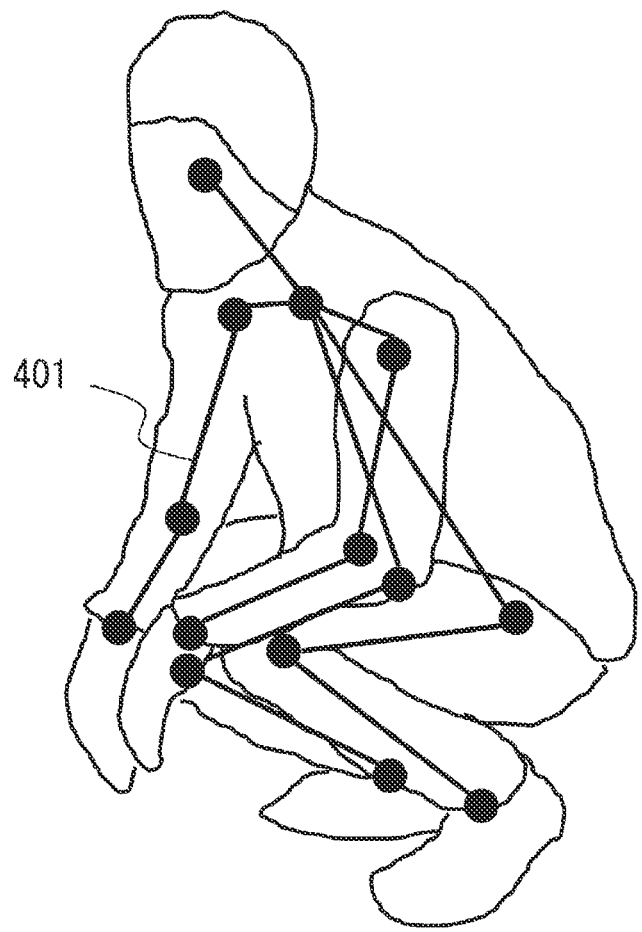
FIG. 17 is a diagram showing an example of detecting the skeleton structure according to the first example embodiment.
Figure 18:
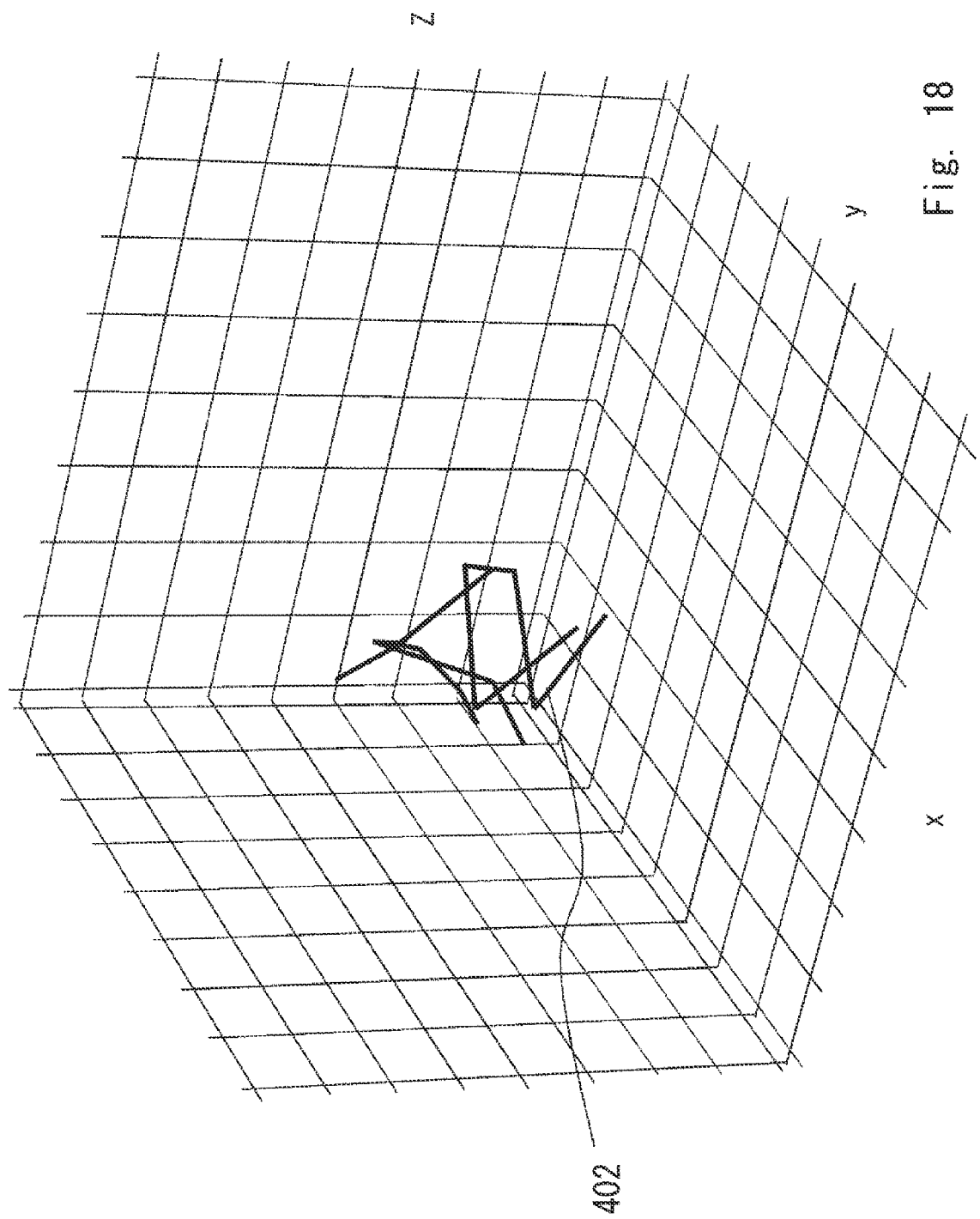
FIG. 18 is a diagram showing a three-dimensional human body model according to the first example embodiment.
Figure 19:
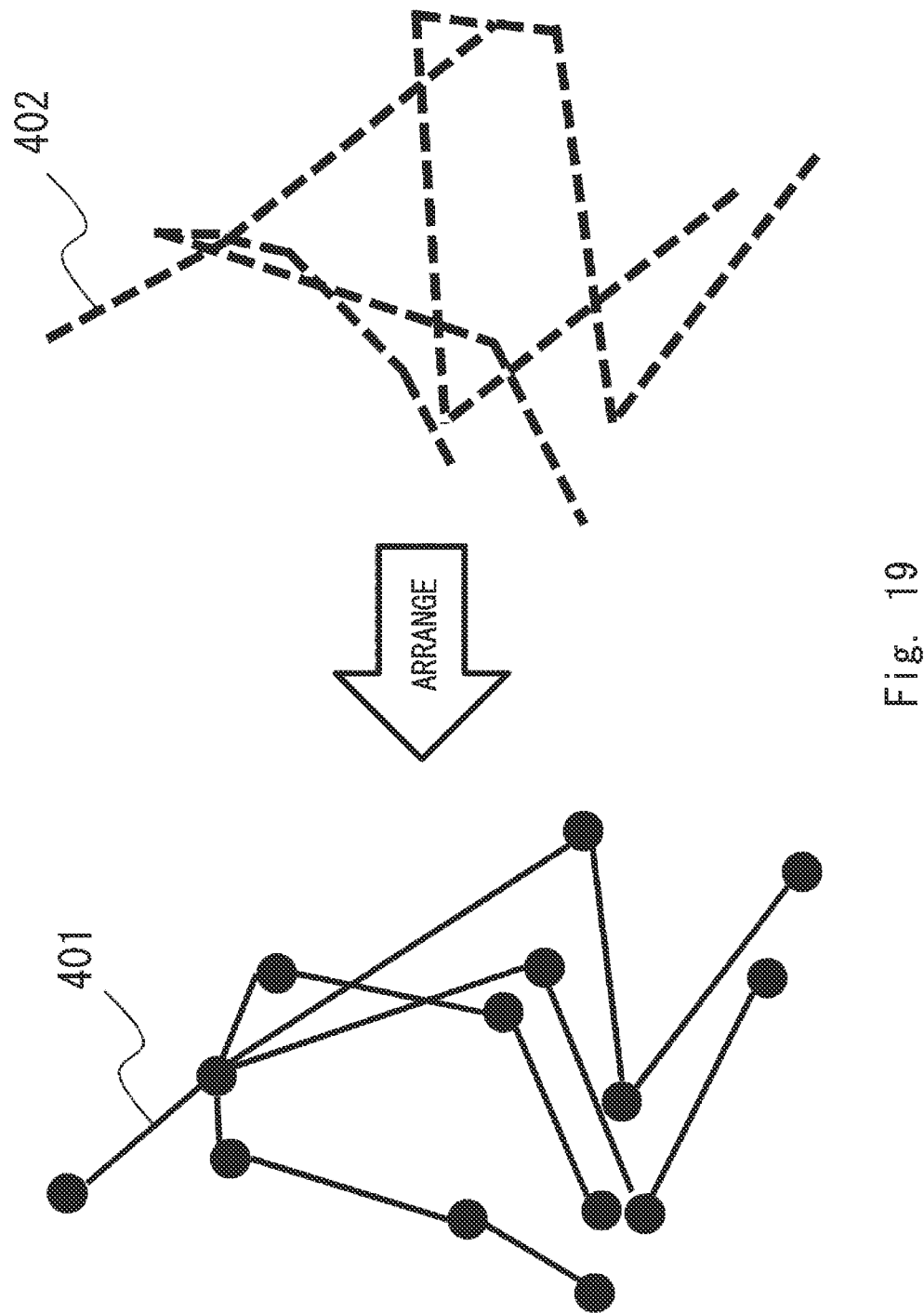
FIG. 19 is a diagram for describing the body height pixel number calculation method according to the first example embodiment.

FIG. 17 is an example of detecting a two-dimensional skeleton structure 401 by capturing an image of a crouching person from the diagonally forward left. The two-dimensional skeleton structure 401 includes two-dimensional coordinate information. While it is preferable that all the bones be detected, some bones may not be detected. With respect to this two-dimensional skeleton structure 401, a three-dimensional human body model 402 as shown in FIG. 18 is prepared. The three-dimensional human body model (three-dimensional skeleton model) 402 is a model that has three-dimensional coordinate information and has skeletons whose shape is the same as that of the two-dimensional skeleton structure 401. Then, as shown in FIG. 19, the prepared three-dimensional human body model 402 is arranged and is made to overlap the detected two-dimensional skeleton structure 401. Further, when the prepared three-dimensional human body model 402 is made to overlap the detected two-dimensional skeleton structure 401, the height of the three-dimensional human body model 402 is adjusted in such a way that it fits the two-dimensional skeleton structure 401.

As shown in FIG. 19, the three-dimensional human body model 402 prepared at this time may be a model which is in a state close to the posture of the two-dimensional skeleton structure 401 or may be a model which is in a state in which the person stands upright. For example, the three-dimensional human body model 402 of the estimated posture may be generated using a technique of estimating the posture of the three-dimensional space from the two-dimensional image using machine learning. By learning information on the joints of the two-dimensional image and the joints of the three-dimensional space, the three-dimensional posture can be estimated from the two-dimensional image.

Figure 20:
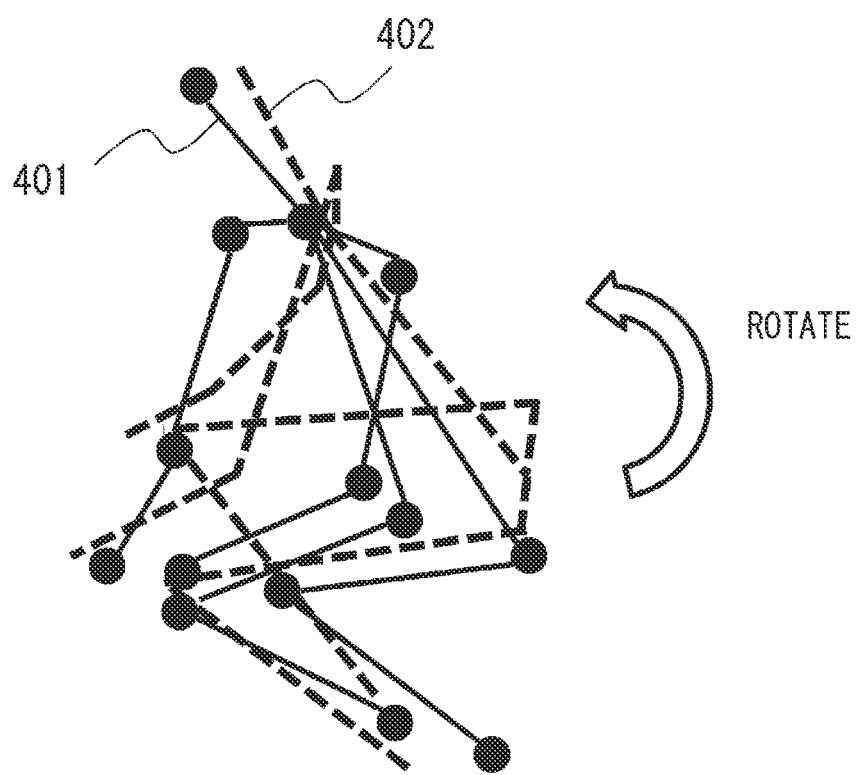
FIG. 20 is a diagram for describing the body height pixel number calculation method according to the first example embodiment.

Next, as shown in FIG. 7, the body height calculation unit 103 causes the three-dimensional human body model to be fit to the two-dimensional skeleton structure (S133). As shown in FIG. 20, the body height calculation unit 103 deforms the three-dimensional human body model 402 in such a way that the posture of the three-dimensional human body model 402 and that of the two-dimensional skeleton structure 401 coincide with each other in a state in which the three-dimensional human body model 402 is made to overlap the two-dimensional skeleton structure 401. That is, the body height, the orientation of the body, and the angles of the joints of the three-dimensional human body model 402 are adjusted and are optimized in such a way that there is no difference between the three-dimensional human body model 402 and the two-dimensional skeleton structure 401. For example, the joints of the three-dimensional human body model 402 are rotated in a range of motion of a person, and the whole three-dimensional human body model 402 is rotated or the entire size is adjusted. The fitting (application) of the three-dimensional human body model and the two-dimensional skeleton structure is performed in the two-dimensional space (two-dimensional coordinates). That is, the three-dimensional human body model is mapped onto the two-dimensional space and the three-dimensional human body model is optimized to the two-dimensional skeleton structure in consideration of how the deformed three-dimensional human body model is changed in the two-dimensional space (image).

Figure 21:
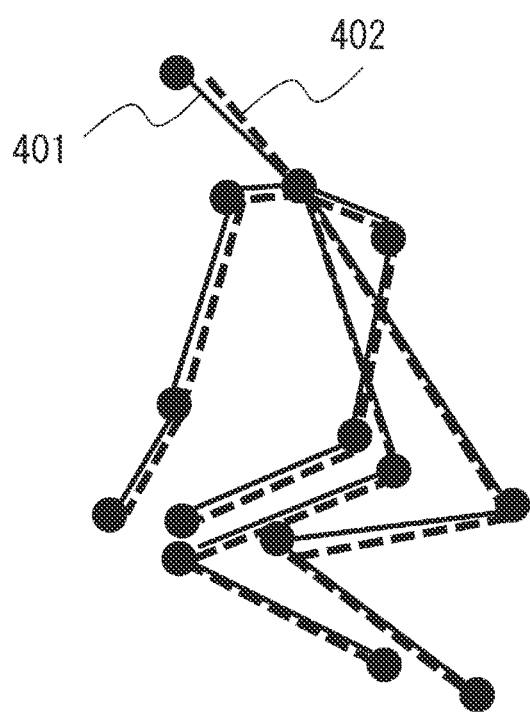
FIG. 21 is a diagram for describing the body height pixel number calculation method according to the first example embodiment.

Next, as shown in FIG. 7, the body height calculation unit 103 calculates the body height pixel number of the three-dimensional human body model that is made to fit to the two-dimensional skeleton structure (S134). As shown in FIG. 21, the body height calculation unit 103 obtains, when there is no difference between the three-dimensional human body model 402 and the two-dimensional skeleton structure 401 and thus the postures coincide with each other, the body height pixel number of the three-dimensional human body model 402 in this state. The body height calculation unit 103 obtains the length of the whole body in the two-dimensional space based on camera parameters as a state in which the optimized three-dimensional human body model 402 is made to stand upright. The body height calculation unit 103 calculates, for example, the body height pixel number by the lengths of the bones (the number of pixels) from the head to the foot when the three-dimensional human body model 402 is made to stand upright. Like in the specific example 1, the lengths of the bones from the head part to the foot part of the three-dimensional human body model 402 may be added up.

In the specific example 3, by causing the three-dimensional human body model to be fit to the two-dimensional skeleton structure based on the camera parameters and obtaining the body height pixel number based on the three-dimensional human body model, the body height pixel number can be estimated with a high accuracy even in a case in which there is a large error since all the bones are not shown in the front, that is, all the bones are shown diagonally.

Normalization Processing

As shown in FIG. 4, the image processing apparatus 100 performs normalization processing (S104) after performing the body height pixel number calculation processing and stores the normalizing value obtained as a result of normalization processing in the database 110 (S105). As shown in FIG. 8, in the normalization processing, the normalizing unit 104 calculates the key point height (S141). The normalizing unit 104 calculates the key point height (the number of pixels) of all the key points included in the detected skeleton structure. The key point height is the length of the height direction from the lowest end (e.g., the key point of one of the feet) of the skeleton structure to its key point. In this example, the key point height is obtained from the Y-coordinate of the key point in the image. As described above, the key point height may be obtained from the length of the direction along the vertical projection axis based on the camera parameters. In the example shown in FIG. 10, for example, the height ($y_i$) of the key point A2 of the neck is a value obtained by subtracting the Y-coordinate of the key point A81 of the right foot or the Y-coordinate of the key point A82 of the left foot from the Y-coordinate of the key point A2.

Next, the normalizing unit 104 specifies the reference point for normalization (S142). The reference point is a point that serves as a reference indicating the relative height of the key point. The reference point may be set in advance or may be selected by a user. The reference point is preferably the center of the skeleton structure or higher than this center (upside in the up-down direction of the image) and may be, for example, coordinates of the key point of the neck. The reference point is not limited to the coordinates of the neck and may be the coordinates of the key point of the head or other key points. Further, the reference point is not limited to a key point and may be desired coordinates (e.g., center coordinates or the like of the skeleton structure).

Next, the normalizing unit 104 normalizes the key point height ($y_i$) by the body height pixel number (S143). The normalizing unit 104 normalizes each key point using the key point height of each key point, the reference point, and the body height pixel number. Specifically, the normalizing unit 104 normalizes the relative height of the key point with respect to the reference point by the body height pixel number. In this example, as an example in which only the height direction is focused on, only the Y-coordinate is extracted, and normalization is performed assuming that the reference point is the key point of the neck. Specifically, the feature (normalizing value) is obtained using the following Expression (1), assuming that the Y-coordinate of the reference point (key point of the neck) is ($y_c$). When the vertical projection axis based on the camera parameters is used, ($y_i$) and ($y_c$) are converted into values in the direction along the vertical projection axis.

$$f_i(y_i - y_c)/h \qquad (1)$$

When, for example, the number of key points is 18, coordinates $(x_0, y_0), (x_1, y_1), \ldots (x_{17}, y_{17})$ of 18 key points are converted into 18-dimensional features as follows using the above Expression (1).

$$f_0 = (y_0 - y_c)/h \qquad (2)$$
$$f_1 = (y_1 - y_c)/h$$
$$\vdots$$
$$f_{17} = (y_{17} - y_c)/h$$

Figure 22:
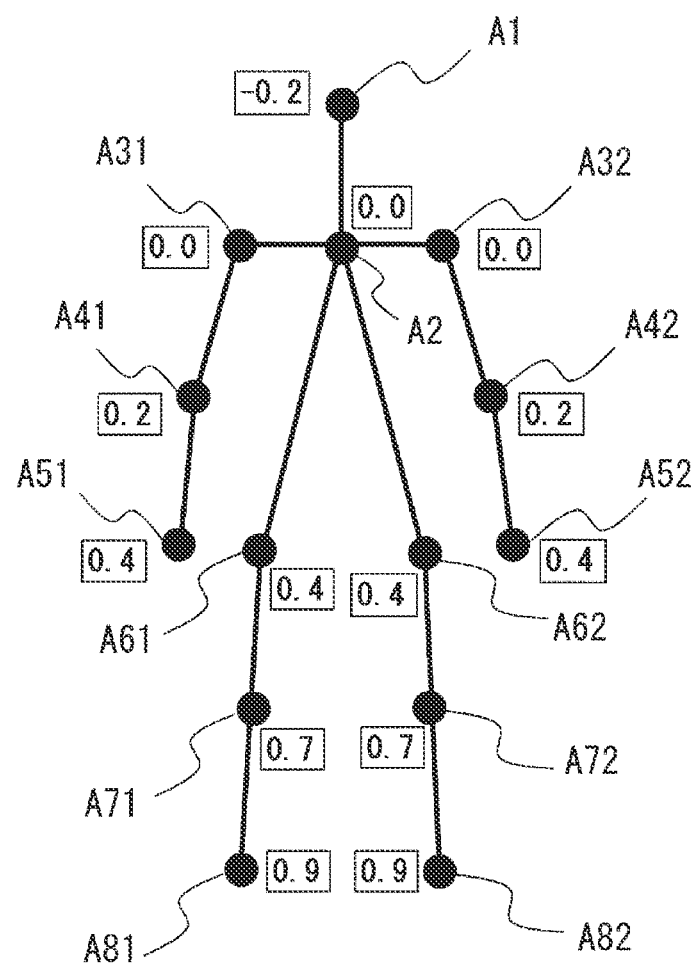
FIG. 22 is a diagram for describing the normalizing method according to the first example embodiment.
Figure 23:
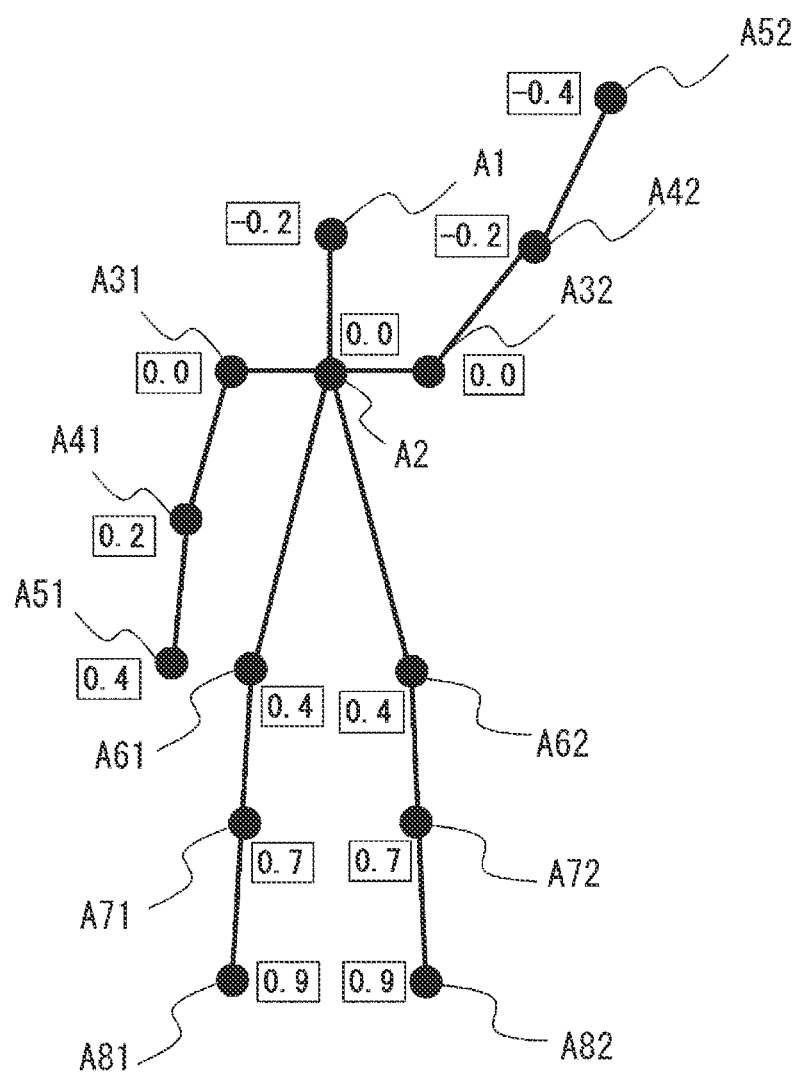
FIG. 23 is a diagram for describing the normalizing method according to the first example embodiment.
Figure 24:
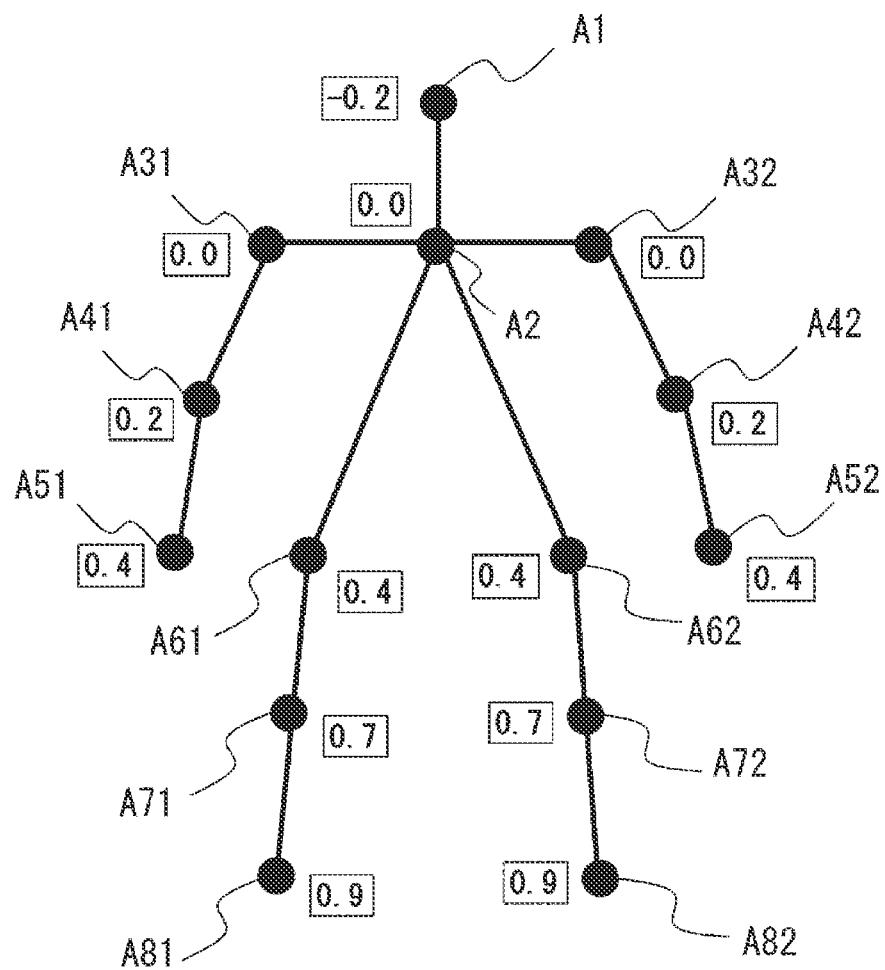
FIG. 24 is a diagram for describing the normalizing method according to the first example embodiment.

FIG. 22 shows an example of the features of the respective key points obtained by the normalizing unit 104. In this example, the key point A2 of the neck is set as the reference point. Therefore, the feature of the key point A2 is 0.0, so is the feature of the key point A31 of the right shoulder and the key point A32 of the left shoulder whose height is the same as that of the neck. The feature of the key point A1 of the head higher than the neck is −0.2. The feature of both the key point A51 of the right hand and the key point A52 of the left hand lower than the neck is 0.4, and the feature of both the key point A81 of the right foot and the key point A82 of the left foot is 0.9. When the person raises his/her left hand from the above state, the left hand becomes higher than the reference point as shown in FIG. 23 and the feature of the key point A52 of the left hand becomes −0.4. On the other hand, since normalization is performed using only coordinates of the Y-axis, the features remain the same as shown in FIG. 24 even when the width of the skeleton structure is changed from the state shown in FIG. 22. That is, the feature (normalizing value) according to this example embodiment, which indicates the feature of the skeleton structure (key point) in the height direction (Y-direction), is not affected by a change in the transverse direction (X-direction) of the skeleton structure.

Effects of First Example Embodiment

As described above, in this example embodiment, the skeleton structure of a person is detected from a two-dimensional image and the respective key points (feature points) of the skeleton structure are normalized using a body height pixel number (the height of the person when the person stands upright in the two-dimensional image space) obtained from the detected skeleton structure. By using the normalized features, robustness when classification, retrieval, and the like are performed can be improved.

Figure 25:
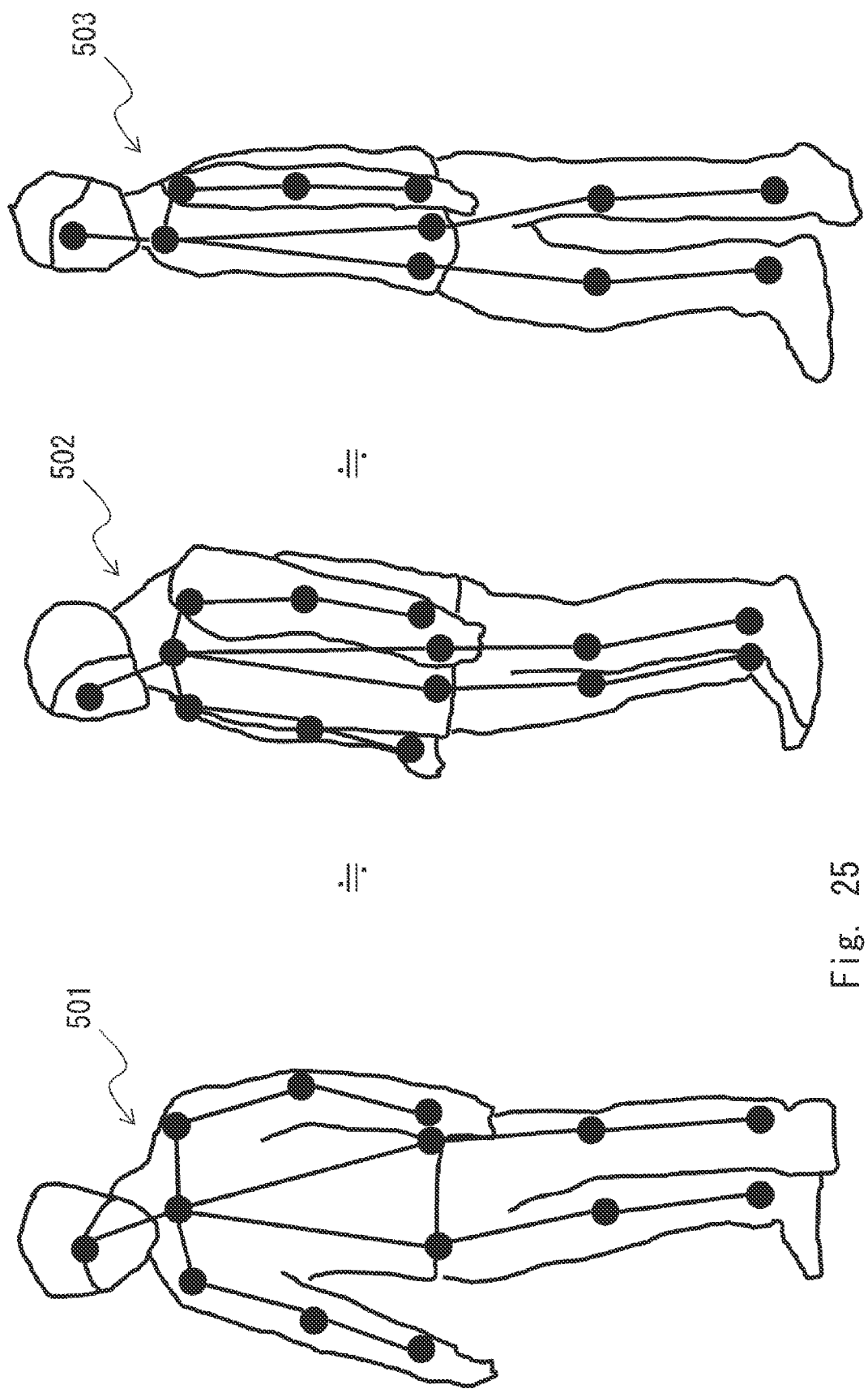
FIG. 25 is a diagram for describing effects of the image processing method according to the first example embodiment.

That is, since the features according to this example embodiment are not affected by a change in the transverse direction of the person as described above, robustness against a change in the orientation of the person or a change in the body shape of the person is high. Even in a case in which, for example, the orientation or the body shape of the person varies from one another as shown in skeleton structures 501-503 in FIG. 25, the features are not greatly changed. It is therefore possible to determine that the postures of the skeleton structures 501-503 are the same when classification and retrieval are performed.

Figure 26:
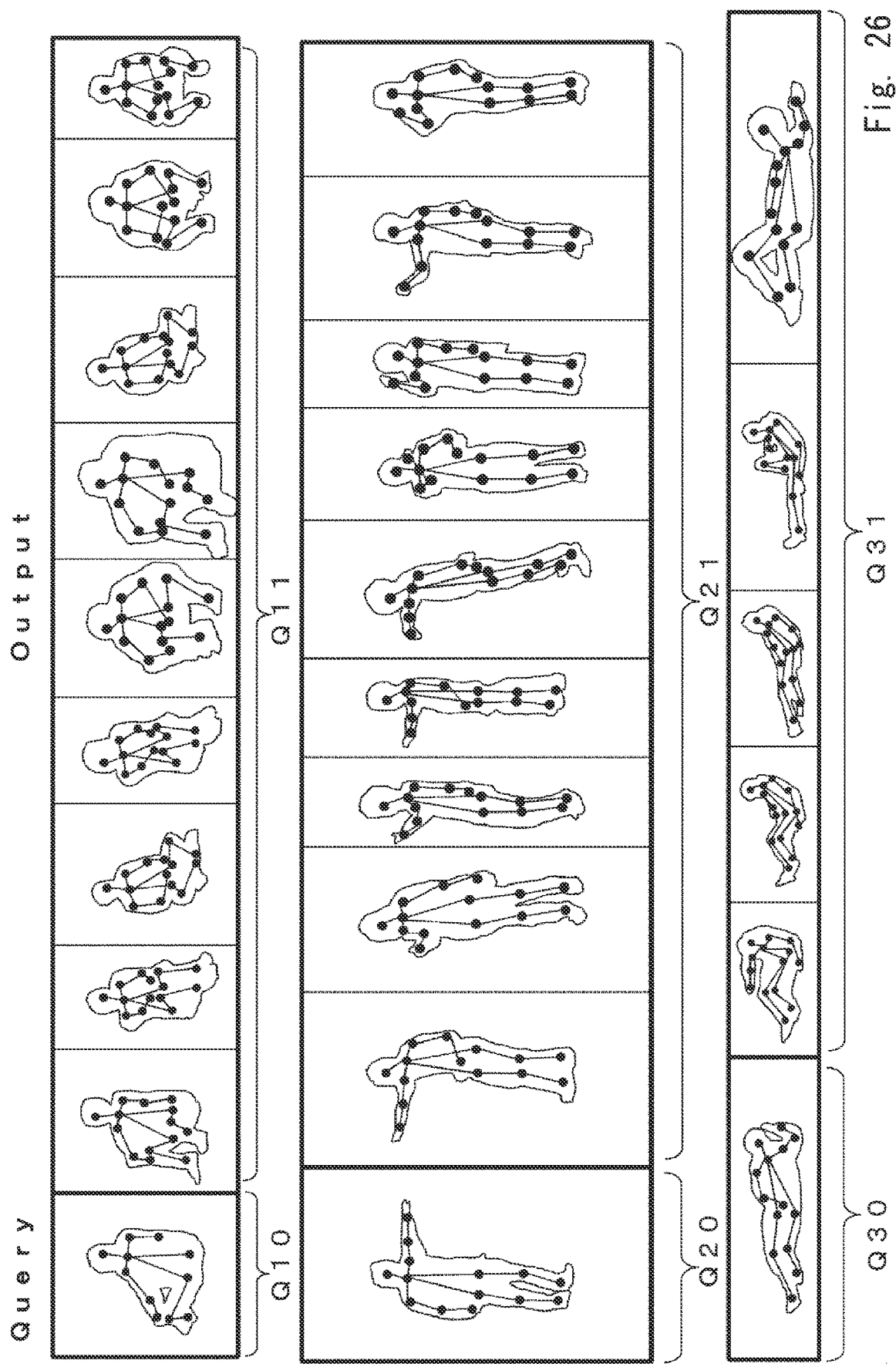
FIG. 26 is a diagram for describing effects of the image processing method according to the first example embodiment.

FIG. 26, which shows an example of results of retrieval, shows results of retrieval Q11, Q21, and Q31 of retrieval queries Q10, Q20, and Q30, respectively. When sitting postures as in the retrieval query Q10 are retrieved, postures in which persons are sitting facing various directions are determined to be similar postures, as shown in the results of retrieval Q11. Likewise, when postures in which persons stand up and extend their right hands horizontally as shown in the retrieval query Q20 are retrieved, postures in which persons stand up and extend their right hands in various directions are determined to be similar postures, as shown in the results of retrieval Q21. Further, when lying postures as in the retrieval query Q30 are retrieved, postures in which persons are lying down facing various directions are determined to be similar postures, as shown in the results of retrieval Q31.

Figure 28:
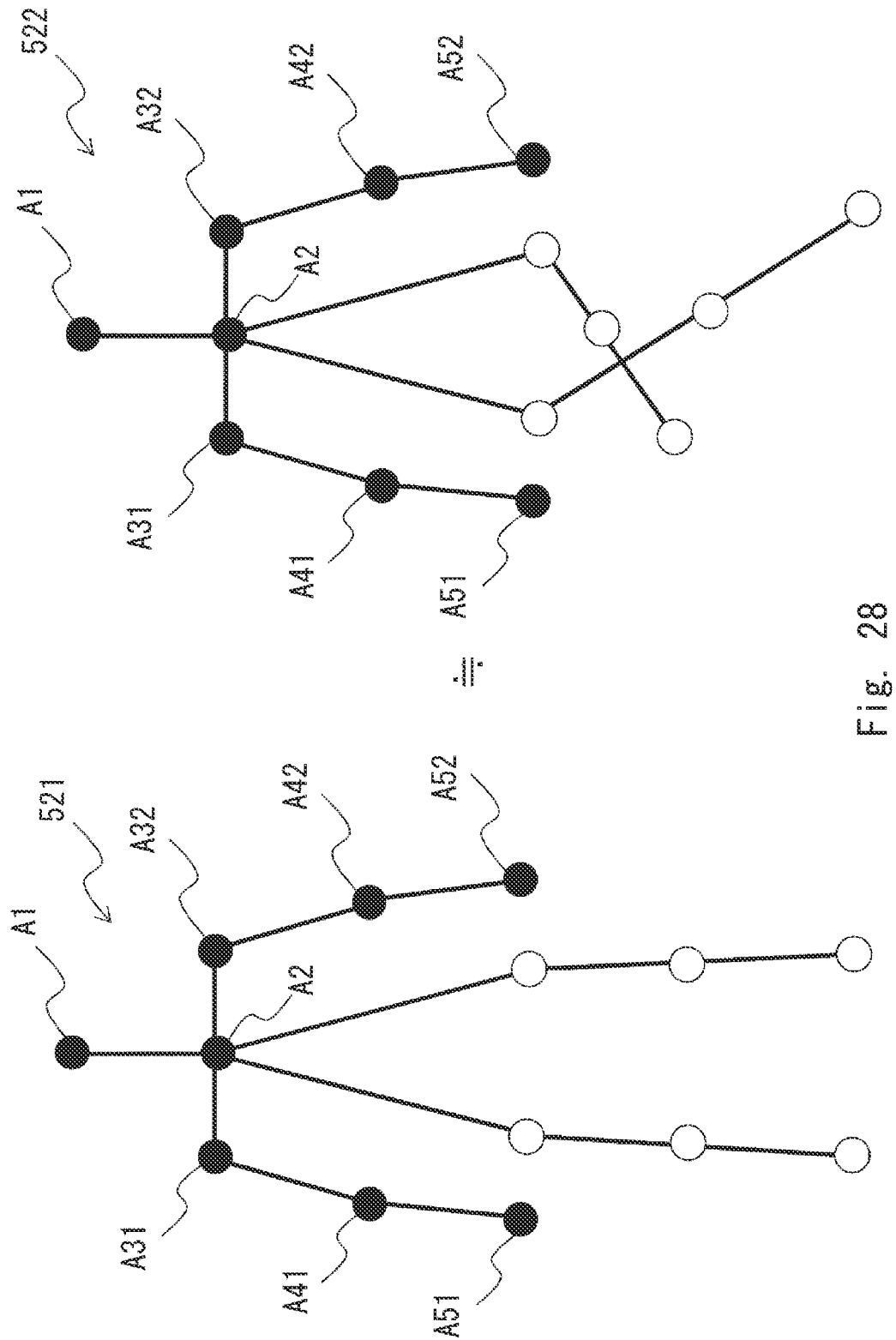
FIG. 28 is a diagram for describing effects of the image processing method according to the first example embodiment.

Further, since the features according to this example embodiment are values obtained by normalizing the respective key points, robustness against images in which a part of the body is hidden is high. For example, even in a case in which key points of the left leg cannot be detected since the left leg is hidden, as shown in skeleton structures 511 and 512 in FIG. 27, features of other key points that have been detected can be used. It is therefore possible to determine that the postures of the skeleton structures 511 and 512 are the same when classification and retrieval are performed. That is, it is possible to perform classification and retrieval using features of some of the key points instead of using all the key points. While the orientation of the both legs in the skeleton structure 521 and that in the skeleton structure 522 shown in FIG. 28 are different from each other, it can be determined that they are the same posture by using the features of the key points (A1, A2, A31, A32, A41, A42, A51, A52) of the upper body as the retrieval query.

Further, since this example embodiment can be achieved by detecting the skeleton structure of a person using the skeleton estimation technique such as OpenPose, there is no need to prepare training data for training postures or the like of the person. Further, by normalizing the key points of the skeleton structure and storing them in the database, it becomes possible to classify and retrieve the postures or the like of the person, whereby it is possible to classify and retrieve unknown postures. Further, by normalizing the key points of the skeleton structure, clear and comprehensive features can be obtained. Therefore, the user is likely to be satisfied with the results of processing, unlike a black box type algorithm such as machine learning.

Figure 29:
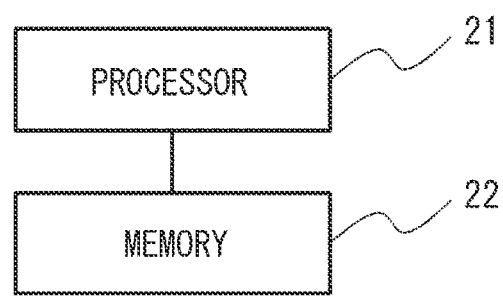
FIG. 29 is a configuration diagram showing an outline of hardware of a computer according to the example embodiment.

Note that each of the configurations in the aforementioned example embodiment may be formed of hardware and/or software and may be formed of one hardware component or one software component or a plurality of hardware components or a plurality of software components. The functions (processing) of the image processing apparatuses 10 and 100 may be implemented by a computer 20 including a processor 21 such as a Central Processing Unit (CPU) and a memory 22, which is a storage apparatus, as shown in FIG. 29. For example, a program (image processing program) for performing the method according to the example embodiment may be stored in the memory 22 and each of the functions may be implemented by causing the processor 21 to execute the program stored in the memory 22.

The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (ROM), CD-R, CD-R/W, and semiconductor memories (such as mask ROM, Programmable ROM (PROM), Erasable PROM (EPROM), flash ROM, Random Access Memory (RAM), etc.). Further, the program(s) be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, the present disclosure is not limited to the aforementioned example embodiment and may be changed as appropriate without departing from the spirit of the present disclosure. For example, while skeleton structures of persons have been detected, skeleton structures of animals other than persons (e.g., mammals, reptiles, birds, amphibians, or fish) may instead be detected.

While the present disclosure has been described with reference to the example embodiment, the present disclosure is not limited to the aforementioned example embodiment. Various changes that may be understood by one skilled in the art may be made to the configurations and the details of the present disclosure within the scope of the present disclosure.

The whole or part of the example embodiment disclosed above can be described as, but not limited to, the following supplementary notes.

Supplementary Note 1

An image processing apparatus comprising:
skeleton detection means for detecting a two-dimensional skeleton structure of a person based on an acquired two-dimensional image;
estimation means for estimating the height of the person when the person stands upright in a two-dimensional image space based on the detected two-dimensional skeleton structure; and
normalizing means for normalizing the detected two-dimensional skeleton structure based on the estimated height of the person when the person stands upright.

Supplementary Note 2

The image processing apparatus according to Supplementary Note 1, wherein the normalizing means normalizes the height of a feature point included in the two-dimensional skeleton structure by the height of the person when the person stands upright.

Supplementary Note 3

The image processing apparatus according to Supplementary Note 2, wherein the height of the feature point is the height of a Y-axis direction in X-Y coordinates that express the two-dimensional image space.

Supplementary Note 4

The image processing apparatus according to Supplementary Note 2, wherein the height of the feature point is the height of a vertical projection direction in which a vertical direction with respect to a reference plane in a three-dimensional space of a real world is projected onto the two-dimensional image space based on an imaging parameter of the two-dimensional image.

Supplementary Note 5

The image processing apparatus according to any one of Supplementary Notes 2 to 4, wherein the normalizing means normalizes a relative height of the feature point with respect to a reference point in the two-dimensional skeleton structure by the height of the person when the person stands upright.

Supplementary Note 6

The image processing apparatus according to Supplementary Note 5, wherein the reference point is a point in the two-dimensional image space which is above the center in the two-dimensional skeleton structure.

Supplementary Note 7

The image processing apparatus according to Supplementary Note 6, wherein the reference point is a feature point of a neck part or a head part in the two-dimensional skeleton structure.

Supplementary Note 8

The image processing apparatus according to any one of Supplementary Notes 1 to 7, wherein the estimation means estimates the height of the person when the person stands upright based on the lengths of the bones in a two-dimensional image space included in the two-dimensional skeleton structure.

Supplementary Note 9

The image processing apparatus according to Supplementary Note 8, wherein the estimation means estimates the height of the person when the person stands upright based on the total lengths of the bones from the foot part to the head part included in the two-dimensional skeleton structure.

Supplementary Note 10

The image processing apparatus according to Supplementary Note 8, wherein the estimation means estimates the height of the person when the person stands upright based on a two-dimensional skeleton model indicating a relation between the lengths of the bones and the length of the whole body of the person in the two-dimensional image space.

Supplementary Note 11

The image processing apparatus according to any one of Supplementary Notes 1 to 7, wherein the estimation means estimates the height of the person when the person stands upright based on a three-dimensional skeleton model fitted to the two-dimensional skeleton structure based on an imaging parameter of the two-dimensional image.

Supplementary Note 12

The image processing apparatus according to any one of Supplementary Notes 1 to 11, wherein
the skeleton detection means detects two-dimensional skeleton structures of a plurality of persons based on the two-dimensional image,
the normalizing means normalizes the two-dimensional skeleton structures of the plurality of persons, and
the image processing apparatus further comprises recognition means for performing processing of recognizing states of the plurality of persons based on normalizing values of the plurality of two-dimensional skeleton structures that have been normalized.

Supplementary Note 13

The image processing apparatus according to Supplementary Note 12, wherein the recognition means classifies states of the plurality of persons as the recognition processing.

Supplementary Note 14

The image processing apparatus according to Supplementary Note 13, wherein the recognition means classifies states of the plurality of persons based on all or some of the normalizing values of the two-dimensional skeleton structures.

Supplementary Note 15

The image processing apparatus according to Supplementary Note 13 or 14, wherein
the skeleton detection means detects two-dimensional skeleton structures of the plurality of persons from a plurality of two-dimensional images that are continuous in times series, and
the recognition means classifies states of the plurality of persons based on normalizing values of the two-dimensional skeleton structures detected from the plurality of two-dimensional images.

Supplementary Note 16

The image processing apparatus according to Supplementary Note 15, wherein the recognition means classifies states of the plurality of persons based on changes in the normalizing values of the two-dimensional skeleton structures in the plurality of two-dimensional images.

Supplementary Note 17

The image processing apparatus according to Supplementary Note 12, wherein the recognition means retrieves a query state from the states of the plurality of persons as the recognition processing.

Supplementary Note 18

The image processing apparatus according to Supplementary Note 17, wherein the recognition means retrieves the query state based on all or some of the normalizing values of the two-dimensional skeleton structures.

Supplementary Note 19

The image processing apparatus according to Supplementary Note 17 or 18, wherein
the skeleton detection means detects two-dimensional skeleton structures of the plurality of persons from a plurality of two-dimensional images that are continuous in times series, and
the recognition means retrieves the query state based on normalizing values of the two-dimensional skeleton structures detected from the plurality of two-dimensional images.

Supplementary Note 20

The image processing apparatus according to Supplementary Note 19, wherein the recognition means retrieves the query state based on changes in the normalizing values of the two-dimensional skeleton structures in the plurality of two-dimensional images.

Supplementary Note 21

An image processing method comprising:
detecting a two-dimensional skeleton structure of a person based on an acquired two-dimensional image;
estimating the height of the person when the person stands upright in a two-dimensional image space based on the detected two-dimensional skeleton structure; and
normalizing the detected two-dimensional skeleton structure based on the estimated height of the person when the person stands upright.

Supplementary Note 22

The image processing method according to Supplementary Note 21, wherein, in the normalization, the height of the feature point included in the two-dimensional skeleton structure is normalized by the height of the person when the person stands upright.

Supplementary Note 23

An image processing program for causing a computer to execute processing of:
detecting a two-dimensional skeleton structure of a person based on an acquired two-dimensional image;
estimating the height of the person when the person stands upright in a two-dimensional image space based on the detected two-dimensional skeleton structure; and
normalizing the detected two-dimensional skeleton structure based on the estimated height of the person when the person stands upright.

Supplementary Note 24

The image processing program according to Supplementary Note 23, wherein, in the normalization, the height of the feature point included in the two-dimensional skeleton structure is normalized by the height of the person when the person stands upright.

REFERENCE SIGNS LIST

1 Image Processing System
10 Image Processing Apparatus
11 Skeleton Detection Unit
12 Estimation Unit
13 Normalizing Unit
20 Computer
21 Processor
22 Memory
100 Image Processing Apparatus
101 Image Acquisition Unit
102 Skeleton Structure Detection Unit
103 Body Height Calculation Unit
104 Normalizing Unit
105 Classification Unit
106 Retrieving Unit
110 Database
200 Camera
300, 301 Human Body Model
401 Two-dimensional Skeleton Structure
402 Three-dimensional Human Body Model

What is claimed is:

1. An image processing apparatus comprising:
at least one memory storing instructions; and
at least one processor configured to execute the instructions stored in the at least one memory to:
  detect a two-dimensional skeleton structure of a person based on an acquired two-dimensional image, wherein the skeleton structure includes a feature point;
  estimate the height of the person when the person stands upright in a two-dimensional image space based on the detected two-dimensional skeleton structure; and
  normalize the height of the feature point included in the detected two-dimensional skeleton structure by the estimated height of the person when the person stands upright, wherein
    detection includes detecting two-dimensional skeleton structures of a plurality of persons based on the two-dimensional image, and
    normalization includes normalizing the skeleton structures of the plurality of persons;
  perform processing of recognizing states of the plurality of persons based on normalizing values of the height of the skeleton structures that have been normalized; and
  cluster the skeleton structures based on a degree of similarity between a plurality of feature points of the skeleton structures.

2. The image processing apparatus according to claim 1, wherein the at least one processor is further configured to execute the instructions stored in the at least one memory to normalize only the height of the feature point included in the two-dimensional skeleton structure by the height of the person when the person stands upright.

3. The image processing apparatus according to claim 2, wherein the height of the feature point is the height of a Y-axis direction in X-Y coordinates that express the two-dimensional image space.

4. The image processing apparatus according to claim 2, wherein the height of the feature point is the height of a vertical projection direction in which a vertical direction with respect to a reference plane in a three-dimensional space of a real world is projected onto the two-dimensional image space based on an imaging parameter of the two-dimensional image.

5. The image processing apparatus according to claim 2, wherein the at least one processor is further configured to execute the instructions stored in the at least one memory to normalize a relative height of the feature point with respect to a reference point in the two-dimensional skeleton structure by the height of the person when the person stands upright.

6. The image processing apparatus according to claim 5, wherein the reference point is a point in the two-dimensional image space which is above the center in the two-dimensional skeleton structure.

7. The image processing apparatus according to claim 6, wherein the reference point is a feature point of a neck part or a head part in the two-dimensional skeleton structure.

8. The image processing apparatus according to claim 1, wherein the at least one processor is further configured to execute the instructions stored in the at least one memory to estimate the height of the person when the person stands upright based on the lengths of bones in a two-dimensional image space included in the two-dimensional skeleton structure.

9. The image processing apparatus according to claim 8, wherein the at least one processor is further configured to execute the instructions stored in the at least one memory to estimate the height of the person when the person stands upright based on the total lengths of the bones from a foot part to a head part included in the two-dimensional skeleton structure.

10. The image processing apparatus according to claim 8, wherein the at least one processor is further configured to execute the instructions stored in the at least one memory to estimate the height of the person when the person stands upright based on a two-dimensional skeleton model indicating a relation between the lengths of the bones and the length of a whole body of the person in the two-dimensional image space.

11. The image processing apparatus according to claim 1, wherein the at least one processor is further configured to execute the instructions stored in the at least one memory to estimate the height of the person when the person stands upright based on a three-dimensional skeleton model fitted to the two-dimensional skeleton structure based on an imaging parameter of the two-dimensional image.

12. The image processing apparatus according to claim 1, wherein
  the at least one processor is further configured to execute the instructions stored in the at least one memory to:
  perform processing of recognizing states of the plurality of persons based on the normalizing values of only the height of the plurality of two-dimensional skeleton structures that have been normalized;
  classify states of the plurality of persons as the recognition processing of recognizing states; and
  classify states of the plurality of persons based on all or some of the normalizing values of the two-dimensional skeleton structures.

13. The image processing apparatus according to claim 12, wherein
the at least one processor is further configured to execute the instructions stored in the at least one memory to detect two-dimensional skeleton structures of the plurality of persons from a plurality of two-dimensional images that are continuous in times series, and
classify states of the plurality of persons based on normalizing values of the two-dimensional skeleton structures detected from the plurality of two-dimensional images.

14. The image processing apparatus according to claim 13, wherein the at least one processor is further configured to execute the instructions stored in the at least one memory to classify states of the plurality of persons based on changes in the normalizing values of the two-dimensional skeleton structures in the plurality of two-dimensional images.

15. The image processing apparatus according to claim 12, wherein the at least one processor is further configured to execute the instructions stored in the at least one memory to retrieve a query state from the states of the plurality of persons as the recognition processing.

16. The image processing apparatus according to claim 15, wherein the at least one processor is further configured to execute the instructions stored in the at least one memory to retrieve the query state based on all or some of the normalizing values of the two-dimensional skeleton structures.

17. The image processing apparatus according to claim 15, wherein
the at least one processor is further configured to execute the instructions stored in the at least one memory to detect two-dimensional skeleton structures of the plurality of persons from a plurality of two-dimensional images that are continuous in times series, and
retrieve the query state based on normalizing values of the two-dimensional skeleton structures detected from the plurality of two-dimensional images.

18. The image processing apparatus according to claim 17, wherein the at least one processor is further configured to execute the instructions stored in the at least one memory to retrieve the query state based on changes in the normalizing values of the two-dimensional skeleton structures in the plurality of two-dimensional images.

19. An image processing method performed by a computer and comprising:
detecting a two-dimensional skeleton structure of a person based on an acquired two-dimensional image, wherein the skeleton structure includes a feature point;
estimating the height of the person when the person stands upright in a two-dimensional image space based on the detected two-dimensional skeleton structure;
normalizing the height of the feature point included in the detected two-dimensional skeleton structure by the estimated height of the person when the person stands upright, wherein
the detecting includes detecting two-dimensional skeleton structures of a plurality of persons based on the two-dimensional image, and
the normalizing includes normalizing the skeleton structures of the plurality of persons;
performing processing of recognizing states of the plurality of persons based on normalizing values of the height of the skeleton structures that have been normalized; and
clustering the skeleton structures based on a degree of similarity between a plurality of feature points of the skeleton structures.

20. A non-transitory computer readable medium storing an image processing program for causing executable by a computer to execute processing comprising:
detecting a two-dimensional skeleton structure of a person based on an acquired two-dimensional image, wherein the skeleton structure includes a feature point;
estimating the height of the person when the person stands upright in a two-dimensional image space based on the detected two-dimensional skeleton structure;
normalizing the height of the feature point included in the detected two-dimensional skeleton structure by the estimated height of the person when the person stands upright, wherein
the detecting includes detecting two-dimensional skeleton structures of a plurality of persons based on the two-dimensional image, and
the normalizing includes normalizing the skeleton structures of the plurality of persons;
performing processing of recognizing states of the plurality of persons based on normalizing values of the height of the skeleton structures that have been normalized; and
clustering the skeleton structures based on a degree of similarity between a plurality of feature points of the skeleton structures.

\* \* \* \* \*